United States Patent
Ma et al.

(10) Patent No.: US 10,034,254 B2
(45) Date of Patent: Jul. 24, 2018

(54) METHOD, DEVICE AND SYSTEM FOR ADJUSTING TIMING ADVANCE

(71) Applicant: Huawei Technologies Co., Ltd., Shenzhen (CN)

(72) Inventors: Chixiang Ma, Shenzhen (CN); Yi Luo, Shenzhen (CN); Xun Yang, Shenzhen (CN); Yingpei Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 15/065,415

(22) Filed: Mar. 9, 2016

(65) Prior Publication Data

US 2016/0192306 A1 Jun. 30, 2016

Related U.S. Application Data

(63) Continuation of application No. PCT/CN2013/083127, filed on Sep. 9, 2013.

(51) Int. Cl.
H04W 56/00 (2009.01)
H04W 72/04 (2009.01)
H04W 88/08 (2009.01)

(52) U.S. Cl.
CPC ......... *H04W 56/001* (2013.01); *H04W 56/00* (2013.01); *H04W 72/0406* (2013.01); *H04W 88/08* (2013.01)

(58) Field of Classification Search
CPC ........... H04W 56/001; H04W 56/0015; H04W 56/002; H04W 56/0045; H04W 56/0055;
(Continued)

(56) References Cited

U.S. PATENT DOCUMENTS

2007/0254656 A1 11/2007 Dalsgaard
2012/0014371 A1 1/2012 Weng et al.
(Continued)

FOREIGN PATENT DOCUMENTS

CN 102511189 A 6/2012
CN 102647783 A 8/2012
(Continued)

OTHER PUBLICATIONS

"Draft Standard for Information Technology—Telecommunications and information exchange between systems—Local and metropolitan area networks—Specific requirements; Part 11; Wireless LAN Medium Access Control (MAC) and Physical Layer (PHY) specifications; Amendment 4: Enhancements for Very High Throughput for Operation in Bands below 6 GHz," IEEE P802.11ac™/D3.0, pp. i-360, Institute of Electrical and Electronics Engineers, New York, New York (Jun. 2012).

(Continued)

*Primary Examiner* — Pao Sinkantarakorn
(74) *Attorney, Agent, or Firm* — Leydig, Voit & Mayer, Ltd.

(57) ABSTRACT

A method for adjusting a timing advance includes: sending an uplink message to an access point, AP, and receiving a downlink message returned by the AP; according to the moment when the uplink message is sent, the moment when the downlink message returned by the AP is received and the fixed time when the downlink message is returned by the AP, obtaining time alignment information; and according to the time alignment information, adjusting the amount of time by which a signal is sent in advance.

14 Claims, 16 Drawing Sheets

(58) Field of Classification Search
CPC ........... H04W 56/0065; H04W 56/007; H04W 56/009
See application file for complete search history.

(56) References Cited

U.S. PATENT DOCUMENTS

| | | |
|---|---|---|
| 2014/0241318 A1 | 8/2014 | Zhong et al. |
| 2015/0045061 A1* | 2/2015 | Da .................... H04W 56/001 455/456.2 |

FOREIGN PATENT DOCUMENTS

| | | |
|---|---|---|
| CN | 102710399 A | 10/2012 |
| CN | 103167598 A | 6/2013 |

OTHER PUBLICATIONS

"IEEE Standard for Information technology—Telecommunications and information exchange between systems; Local and metropolitan area networks—Specific requirements; Part 11: Wireless LAN Medium Access Control (MAC) and Physical Layer (PHY) Specifications," IEEE Computer Society, IEEE Std 802.11-2012, pp. i-2695, Institute of Electrical and Electronics Engineers, New York, New York (Mar. 29, 2012).
Perahia et al., "Next Generation Wireless LANs; Throughput, Robustness and Reliability in 802.11n," pp. 1-385, Cambridge University Press, New York, New York (2008).
Sesia et al., "LTE—The UMTS Long Term Evolution; From Theory to Practice; Second Edition," pp. i-752, John Wiley & Sons Ltd. (2011).

\* cited by examiner

METHOD, DEVICE AND SYSTEM FOR ADJUSTING TIMING ADVANCE

CROSS-REFERENCE TO RELATED APPLICATIONS

This application is a continuation of International Patent Application No. PCT/CN2013/083127, filed on Sep. 9, 2013, which is hereby incorporated by reference in its entirety.

FIELD

The present application relates to the field of communication, and in particular to a method, device and system for adjusting a timing advance.

BACKGROUND

With a fast development of communication technology, more and more user equipments are accessed to a wireless network. The user equipments need to transmit signals to a network side device, to implement the communication. In a signal transmission process, there is a difference between a preset transmission time period and an actual transmission time period during which the signal is transmitted from the user equipment to the network side device, and thereby resulting in that the signal is not received by the network side device at a preset time slot. In this case, the time slot for receiving the signal by the network side device is the same as that for receiving a signal by the network side device from other user equipments. Thus, different signals produce mutual interference. In order to address this issue, the user equipment may send a signal in advance, and a length of time for advancing a transmission of the signal is defined as a TA (Timing Advance). However, a position of the user equipment may change at any time instant, a time instant when the signal sent by the user equipment arrives at the network side device changes accordingly, hence the TA needs to be adjusted by the user equipment continuously.

In the conventional technology, the TA is adjusted as follows. In an LTE (Long Term Evolution, long term evolution) system, a UE (User Equipment, user equipment) completes initial downlink synchronization with a network side device eNB (evolved Node B), and then adjusts the TA by an RA (Random Access) process. The process for adjusting the TA includes that: the UE sends a random access preamble sequence to the eNB on a specified time-frequency resource; the eNB receives the random access preamble sequence and sends to the UE a random access response message including a TA command; and the UE receives the random access response message and adjusts the TA. In the signal transmission process between the UE and the eNB, the UE needs to adjust the TA continuously, to ensure that a time instant when the signal sent by the UE arrives at the eNB aligns with a time slot for the eNB.

In a process for implementing the present application, the inventor found at least the following issues in the conventional technology.

Time-frequency resources used for the LTE system is acquired by purchasing a license, and the time-frequency resources are used exclusively. Thus, in the LTE system, different UEs may use respective time-frequency resources to adjust the TA according to the preset system configuration. However, for free frequency bands, the time-frequency resource is obtained by competition due to the limitation that a device generates harmful interference in the regulations set by the spectrum management mechanism. Thus, particular time-frequency resources can not be distributed to a certain user equipment, and thereby leading to that the user equipment can not use the method for adjusting the TA in the LTE system in the case of no certain time-frequency resource. Therefore, an application range of the method for adjusting the TA in the LTE system is limited, and the method for adjusting the TA in the LTE system can not be applied to a wider field to reduce interference between signals.

SUMMARY

In order to address an issue in the conventional technology, a method, device and system for adjusting a timing advance are provided according to embodiments of the present application. Technical solutions of the present application are described hereinafter.

In an aspect, a method for adjusting a timing advance is provided, where the method is applied to a wireless local area network and the method includes:

sending an uplink message to an access point AP and receiving a downlink message returned by the AP;

obtaining time alignment information based on a time instant when the uplink message is sent, a time instant when the downlink message returned by the AP is received and a fixed time period during which the downlink message is returned by the AP; and adjusting a timing advance of a signal transmission based on the time alignment information.

According to the first aspect, in a first possible implementation of the first aspect, the obtaining time alignment information based on a time instant when the uplink message is sent, a time instant when the downlink message returned by the AP is received and a fixed time period during which the downlink message is returned by the AP may include:

obtaining the time alignment information according to a formula T=t1−t2−FT, where T indicates the time alignment information obtained by a measurement, t1 indicates the time instant when the downlink message returned by the AP is received, t2 indicates the time instant when the uplink message is sent to the AP, and FT indicates the fixed time period during which the downlink message is returned by the AP.

According to the first aspect or the first possible implementation of the first aspect, in a second implementation of the first aspect, the uplink message sent to the AP is a timing advance TA request message, and the downlink message returned by the AP is a TA response message; or the uplink message sent to the AP is a request-to-send RTS message, and the downlink message returned by the AP is a clear-to-send CTS message; or the uplink message sent to the AP is a data frame message, and the downlink message returned by the AP is an acknowledge ACK message.

According to the second possible implementation of the first aspect, in a third possible implementation of the first aspect, before sending the TA request message to the AP, the method may further include:

receiving a TA polling message from the AP, where the TA request message is sent to the AP based on the TA polling message.

In a second aspect, a method for adjusting a timing advance is provided, where the method is applied to a wireless local area network and the method includes:

receiving an uplink message from a user equipment STA; and returning a downlink message to the STA, where the STA obtains time alignment information based on a time instant when the uplink message is sent, a time instant when the downlink message is returned to the STA and a fixed time period during which the downlink message is returned to the STA; and adjusts a timing advance of a signal transmission based on the time alignment information.

According to the second aspect, in a first possible implementation of the second aspect, the uplink message received from the user equipment STA is a timing advance TA request message, and the downlink message returned to the STA is a TA response message; or the uplink message sent by the STA is a request-to-send RTS message, and the downlink message returned to the STA is a clear-to-send CTS message; or the uplink message sent by the STA is a data frame message, and the downlink message returned to the STA is an acknowledge ACK message.

According to the first possible implementation of the second aspect, in a second possible implementation of the second aspect, before receiving the TA request message from the STA, the method further includes:

sending a TA polling message to the STA, where the STA sends the TA request message based on the TA polling message.

In a third aspect, a user equipment is provided, where the user equipment is applied to a wireless local area network and the user equipment includes:

a sending module configured to send an uplink message to an access point AP;

a receiving module configured to receive a downlink message returned by the AP;

an obtaining module configured to obtain time alignment information based on a time instant when the uplink message is sent, a time instant when the downlink message is received and a fixed time period during which the downlink message is returned by the AP; and an adjusting module configured to adjust a timing advance of a signal transmission based on the time alignment information.

According to the third aspect, in a first possible implementation of the third aspect, the obtaining module is configured to obtain the time alignment information according to a formula T=t1−t2−FT, where T indicates the time alignment information obtained by a measurement, t1 indicates a time instant when the downlink message returned by the AP is received, t2 indicates a time instant when the uplink message is sent to the AP, and FT indicates a fixed time period during which the downlink message is returned by the AP.

According to the third aspect or the first possible implementation of the third aspect, in a second possible implementation of the third aspect, the uplink message sent from the sending module to the AP is a timing advance TA request message, and the downlink message returned by the AP and received by the receiving module is a TA response message; or the uplink message sent from the sending module to the AP is a request-to-send RTS message, and the downlink message returned by the AP and received by the receiving module is a clear-to-send CTS message; or the uplink message sent from the sending module to the AP is a data frame message, and the downlink message returned by the AP and received by the receiving module is an acknowledge ACK message.

According to the second possible implementation of the third aspect, in a third possible implementation of the third aspect, the receiving module is further configured to receive a TA polling message from the AP; where the sending module is configured to send the TA request message to the AP based on the TA polling message.

In a fourth aspect, an access point is provided, where the access point is applied to a wireless local area network and the access point includes:

a receiving module configured to receive an uplink message from a user equipment STA; and a returning module configured to return a downlink message to the STA, where the STA obtains time alignment information based on a time instant when the uplink message is sent, a time instant when the downlink message is returned to the STA and a fixed time period during which the downlink message is returned to the STA; and adjusts a timing advance of a signal transmission based on the time alignment information.

According to the fourth aspect, in a first possible implementation of the fourth aspect, the uplink message sent by the user equipment STA and received by the receiving module is a timing advance TA request message, and the downlink message returned from the returning module to the STA is a TA response message; or the uplink message sent by the STA and received by the receiving module is a request-to-send RTS message, and the downlink message returned from the returning module to the STA is a clear-to-send CTS message; or the uplink message sent by the STA and received by the receiving module is a data frame message, and the downlink message returned from the returning module to the STA is an acknowledge ACK message.

According to the first possible implementation of the fourth aspect, in a second possible implementation of the fourth aspect, the returning module is further configured to send a TA polling message to the STA; where the STA sends the TA request message based on the TA polling message.

In a fifth aspect, a system for adjusting a timing advance is provided, where the system is applied to a wireless local area network and the system includes a user equipment STA and an access point AP;

where the STA is the STA described above; and
the AP is the AP described above.

In a sixth aspect, a method for adjusting a timing advance is provided, where the method is applied to a wireless local area network and the method includes:

receiving a downlink message from an access point AP and returning an uplink message to the AP, where the AP obtains time alignment information based on a time instant when the downlink message is sent, a time instant when the uplink message is received and a fixed time period during which the uplink message is returned to the AP;

acquiring the time alignment information obtained by the AP; and adjusting a timing advance of a signal transmission based on the time alignment information.

According to the sixth aspect, in a first possible implementation of the sixth aspect, the acquiring the time alignment information obtained by the AP includes:

receiving a timing advance TA adjusting command sent by the AP and acquiring the time alignment information from the TA adjusting command.

According to the sixth aspect, in a second possible implementation of the sixth aspect, the received downlink message sent by the AP is a TA polling message, and the uplink message returned to the AP is a TA sequence message; or the downlink message sent by the AP is a request-to-send RTS message, and the uplink message returned to the AP is a clear-to-send CTS message; or the downlink message sent by the AP is a data frame message, and the uplink message returned to the AP is an acknowledge ACK message; or the downlink message sent by the AP is a downlink message carrying a downlink reference signal, and the uplink message returned to the AP is an uplink message carrying an uplink reference signal.

According to the sixth aspect, in a third possible implementation of the sixth aspect, before receiving a TA polling message sent by the AP, the method further includes:

sending a TA request message to the AP, where the AP sends the TA polling message in response to the TA request message.

In a seventh aspect, a method for adjusting a timing advance is provided, where the method is applied to a wireless local area network and the method includes:

sending a downlink message to a user equipment STA and receiving an uplink message returned by the STA;

obtaining time alignment information based on a time instant when the downlink message is sent, a time instant when the uplink message returned by the STA is received and a fixed time period during which the uplink message is returned by the STA; and sending the obtained time alignment information to the STA, where the STA adjusts a timing advance of a signal transmission based on the time alignment information.

According to the seventh aspect, in a first possible implementation of the seventh aspect, the sending the obtained time alignment information to the STA, where the STA adjusts a timing advance for sending a signal based on the time alignment information, includes:

sending to the STA a timing advance TA adjusting command carrying the time alignment information, where the STA adjusts the timing advance of the signal transmission based on the time alignment information carried in the TA adjusting command.

According to the seventh aspect, in a second possible implementation of the seventh aspect, the obtaining time alignment information based on a time instant when the downlink message is sent, a time instant when the uplink message returned by the STA is received and a fixed time period during which an uplink signal is returned by the STA includes:

obtaining the time alignment information according to a formula T'=t1'−t2'−FT', where T' indicates the time alignment information obtained by a measurement, t1' indicates a time instant when the uplink message returned by the STA is received, t2' indicates a time instant when the downlink message is sent, and FT' indicates a fixed time period during which the uplink signal is returned by the STA.

According to the seventh aspect, in a third possible implementation of the seventh aspect, the downlink message sent to the STA is a TA polling message, and the uplink message returned by the STA is a TA sequence message; or the downlink message sent to the STA is a request-to-send RTS message, and the uplink message returned by the STA is a clear-to-send CTS message; or the downlink message sent to the STA is a data frame message, and the uplink message returned by the STA is an acknowledge ACK message; or the uplink message sent to the STA is a downlink message carrying a downlink reference signal, and the uplink message returned by the STA is an uplink message carrying an uplink reference signal.

According to the seventh aspect, in a fourth possible implementation of the seventh aspect, before sending a TA polling message to the STA, the method further includes:

receiving a TA request message sent by the STA, where the TA polling message is sent to the STA in response to the TA request message.

In an eighth aspect, a user equipment is provided, where the user equipment is applied to a wireless local area network and the user equipment includes:

a receiving module configured to receive a downlink message from an access point AP;

a returning module configured to return an uplink message to the AP, where the AP obtains time alignment information based on a time instant when the downlink message is sent, a time instant when the uplink message is received and a fixed time period during which the uplink message is returned to the AP;

an acquiring module configured to acquire the time alignment information obtained by the AP; and an adjusting module configured to adjust a timing advance of a signal transmission based on the time alignment information.

According to the eighth aspect, in a first possible implementation of the eighth aspect, the acquiring module is configured to receive a timing advance TA adjusting command from the AP, and acquire the time alignment information from the TA adjusting command.

According to the eighth aspect, in a second possible implantation of the eighth aspect, the downlink message sent by the AP and received by the receiving module is a TA polling message, and the uplink message returned from the returning module to the AP is a TA sequence message; or the downlink message sent by the AP and received by the receiving module is a request-to-send RTS message, and the uplink message returned from the returning module to the AP is a clear-to-send CTS message; or the downlink message sent by the AP and received by the receiving module is a data frame message, and the uplink message returned from the returning module to the AP is an acknowledge ACK message; or the downlink message sent by the AP and received by the receiving module is a downlink message carrying a downlink reference signal, and the uplink message returned from the returning module to the AP is an uplink message carrying an uplink reference signal.

According to the eighth aspect, in a third possible implementation of the eighth aspect, the user equipment further includes:

a sending module configured to send a TA request message to the AP, where the AP sends a TA polling message in response to the TA request message.

In a ninth aspect, an access point is provided, where the access point is applied to a wireless local area network and the access point includes:

a first sending module configured to send a downlink message to a user equipment STA;

a receiving module configured to receive an uplink message returned by the STA;

a measuring module configured to obtain time alignment information based on a time instant when the downlink message is sent, a time instant when the uplink message is returned by the STA and a fixed time period during which the uplink message is returned by the STA; and a second sending module configured to send the obtained time alignment information to the STA, where the STA adjusts a timing advance of a signal transmission based on the time alignment information.

According to the ninth aspect, in a first possible implementation of the ninth aspect, the second sending module is configured to send to the STA a timing advance TA adjusting command carrying the time alignment information, where the STA adjusts the timing advance of the signal transmission based on the time alignment information carried in the TA adjusting command.

According to the ninth aspect, in a second possible implementation of the ninth aspect, the measuring module is configured to obtain the time alignment information according to a formula T'=t1'-t2'-FT', where T' indicates the time alignment information obtained by a measurement, t1' indicates a time instant when the uplink message returned by the STA is received, t2' indicates a time instant when the downlink message is sent, and FT' indicates a fixed time period during which the uplink signal is returned by the STA.

According to the ninth aspect, in a third possible implementation of the ninth aspect, the downlink message sent from the first sending module to the STA is a TA polling message, and the uplink message returned by the STA and received by the receiving module is a TA sequence message; or the downlink message sent from the first sending module to the STA is a request-to-send RTS message, and the uplink message returned by the STA and received by the receiving module is a clear-to-send CTS message; or the downlink message sent from the first sending module to the STA is a data frame message, and the uplink message returned by the STA and received by the receiving module is an acknowledge ACK message; or the downlink message sent from the first sending module to the STA is a downlink message carrying a downlink reference signal, and the uplink message returned by the STA and received by the receiving module is an uplink message carrying an uplink reference signal.

According to the ninth aspect, in a fourth possible implementation of the ninth aspect, the receiving module is further configured to receive a TA request message from the STA; where the first sending module is configured to send the TA polling message to the STA in response to the TA request message.

In a tenth aspect, a system for adjusting a timing advance is provided, where the system is applied to a wireless local area network and the system includes a user equipment STA and an access point AP;

where the STA is the second STA as described above; and the AP is the second AP as described above.

The benefit effects of the technical solution according to the embodiments of the present application are as follows: the AP or the STA measurements and obtains the time alignment information based on the sent message and the received message, and adjusts the timing advance for sending the signal from the STA to the AP based on the time alignment information, such that the STA can adjust the timing advance of the signal transmission in the case of limited time-frequency resources, and thereby reducing interference among signals sent from different STAs to the AP.

BRIEF DESCRIPTION OF THE DRAWINGS

In order to illustrate technical solutions in embodiments of the present application more clearly, hereinafter drawings to be used in the description of the embodiments are introduced simply. Apparently, the drawings described below only describe some embodiments of the present application. Those skilled in the art may obtain other drawings based on theses drawings without any creative work.

DETAILED DESCRIPTION OF EMBODIMENTS

In order to describe objects, technical solutions and advantages of the present application more clearly, hereinafter embodiments of the present application are described in detail in conjunction with the drawings.

Figure 1:
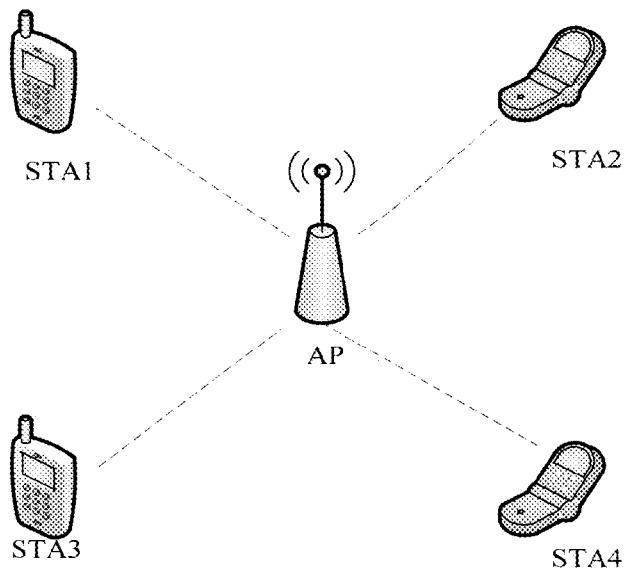
FIG. 1 is a schematic diagram of a system of a typical wireless local area network.

FIG. 1 shows a system architecture of a typical wireless local area network. In the typical wireless local area network, before any one of multiple STAs (Station, user equipment) communicates with an AP (Access point), the STA needs to obtain a time-frequency resource by competition and then communicates with the AP on the time-frequency resource. That is, the time-frequency resource on which the STA communicates with the AP is not proprietary, which is obtained by competition. For a case that the STA can not obtain a particular time-frequency resource, in order to reduce interference among signals sent from different STAs to the AP, a method, device and system for adjusting a TA are provided according to the embodiments of the present application, which is applied to a wireless local area network. Specific contents are described in the following embodiments.

First Embodiment

Figure 2:
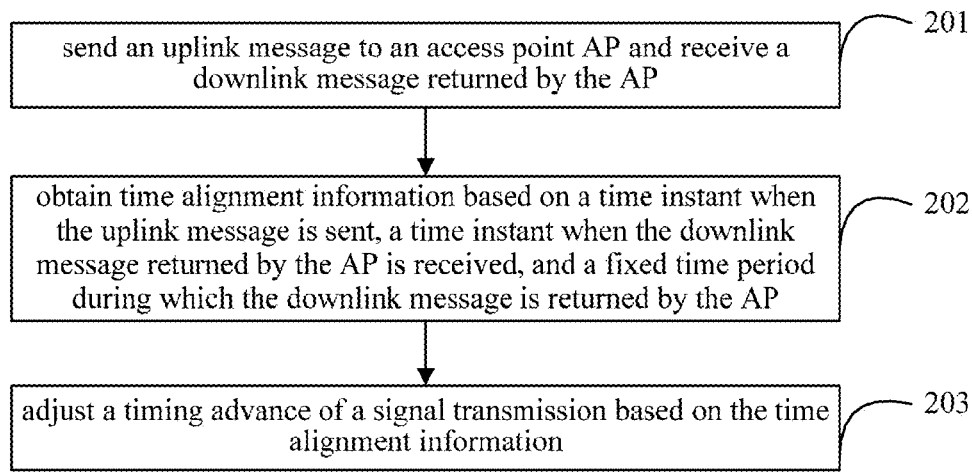
FIG. 2 is a flowchart of a method for adjusting a timing advance according to a first embodiment of the present application.

A method for adjusting a timing advance is provided according to an embodiment of the present application. The method is applied to the wireless local area network as shown in FIG. 1. In order to describe the method more clearly, in the first embodiment and subsequent embodiments of the present application, a signal sent from an STA to an AP is defined as an uplink signal, a signal sent from the AP to the STA is defined as a downlink signal, a message sent from the STA to the AP is defined as an uplink message, and a message sent from the AP to the STA is defined as a downlink message. Subsequently, the method according to the embodiment of the present application is described in detail from an STA side, and it is assumed that the STA measurements time alignment information. Referring to FIG. 2, a flow of the method according to the embodiment of the present application includes the follows.

In 201, an uplink message is sent to an access point AP, and a downlink message returned by the AP is received.

In 202, time alignment information is obtained based on a time instant when the uplink message is sent, a time instant when the downlink message returned by the AP is received and a fixed time period during which the downlink message is returned by the AP.

In 203, a timing advance of a signal transmission is adjusted based on the time alignment information.

Figure 3:
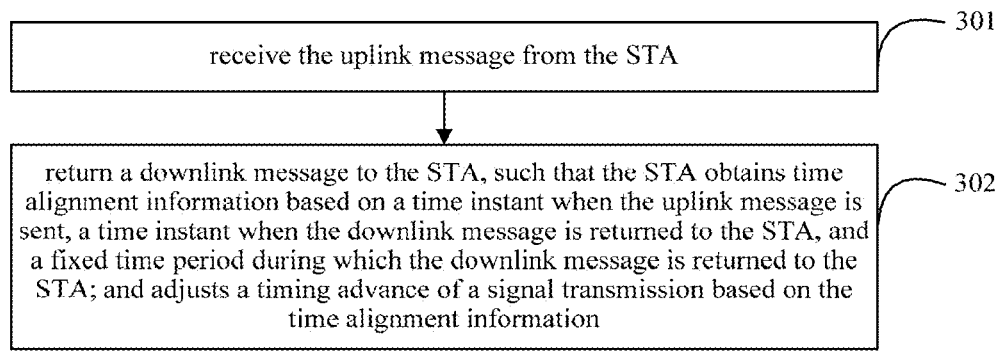
FIG. 3 is a flowchart of another method for adjusting a timing advance according to the first embodiment of the present application.

The method according to the first embodiment is described from an AP side, and it is assumed that the STA measurements time alignment information. Referring to FIG. 3, a flow of the method according to the embodiment of the present application includes the follows.

In 301, an uplink message is received from an STA.

In 302, a downlink message is returned to the STA, such that the STA obtains time alignment information based on a time instant when the uplink message is sent, a time instant when the downlink message is returned to the STA and a fixed time period during which the downlink message is returned to the STA, and then adjusts a timing advance of a signal transmission based on the time alignment information.

With the method according to the embodiment of the present application, the STA measurements and obtains the time alignment information based on the sent message and the received message, and adjusts the timing advance for sending the signal from the STA to the AP based on the time alignment information, such that the STA can adjust the timing advance of the signal transmission in the case of limited time-frequency resources, and thereby reducing interference among signals sent from different STAs to the AP.

Second Embodiment

Figure 4:
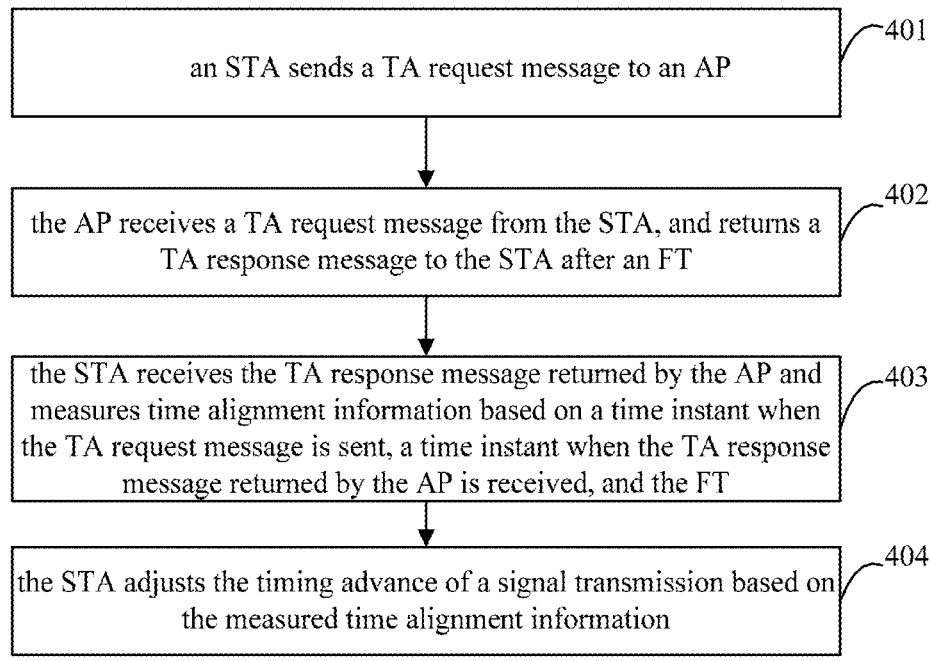
FIG. 4 is a flowchart of a method for adjusting a timing advance according to a second embodiment of the present application.

In conjunction with the content of the first embodiment, a method for adjusting a timing advance is provided according to an embodiment of the present application. The method may be applied to the wireless local area network as shown in FIG. 1. In order to facilitate illustrating, the method according to the embodiment of the present application is described by assuming that an STA initiates to adjust a timing advance, an uplink message sent from the STA to an AP is a TA request message, and a downlink message returned from the AP to the STA is a TA response message. Referring to FIG. 4, a flow of the method according to the embodiment of the present application includes the follows.

In 401, an STA sends a TA request message to an AP.

In this step, the STA sends the TA request message to the AP after obtaining a time-frequency resource by competition. A competing way for obtaining the time-frequency resource by the STA is not limited in the embodiment of the present application, and the conventional competing ways may be adopted in a specific implementation. The TA request message may be sent in a form of a data frame, which is not limited in the embodiment of the present application. The STA sends the TA request message to the AP, such that the STA can measure time alignment information based on a time difference between a time instant when the message is sent and a time instant when the message is received in subsequent steps.

The wireless local area network includes multiple STAs. In order to make the AP to identify the STA which sends the TA request information, an identifier of the STA may be carried in the TA request information sent from the STA to the AP. Specifically, the identifier of the STA includes but not limited to a MAC address corresponding to the STA. Specific contents of the identifier of the STA are not limited in the embodiment of the present application. Alternatively, TA request messages sent by different STAs may be distinguished in designing the TA request messages. For example, if TA request messages sent by different STAs may form a sequence, the TA request messages sent by different STAs may be distinguished by a sequence designing method.

In addition, in the embodiment of the present application, one AP communicates with multiple STAs, and thus the AP does not need to be identified. However, in a case of multiple APs in the wireless local area network, an identifier for distinguishing different APs is carried in the TA request message sent from the STA to the AP, which is configured to identify different APs. Similarly, the identifier for identifying the AP includes but not limited to a MAC address corresponding to the AP, and specific contents of the identifier of the AP are not limited in the embodiment of the present application.

In 402, the AP receives the TA request message from the STA and returns a TA response message to the STA after an FT.

In this step, one AP may communicate with multiple STAs and the AP needs to return TA response messages to respective STAs at different time slots in response to the TA request messages sent by different STAs, hence the AP distributes particular time slots to return TA response messages to respective STAs. That is, once receiving the TA request message sent by the STA, the AP returns the TA response message to the STA after an FT (Fixed Time, fixed time period). The FT may be any time duration, and a size of the FT is not limited in the embodiment of the present application. The FT may be set by the AP negotiating with the STA in advance, or may be determined by the AP. If the FT is determined by the AP, the FT is carried in the TA response message returned from the AP to the STA.

In the embodiment of the present application, the TA response message may be sent in a form of a data frame, which is not limited in the embodiment of the present application. In addition, due to multiple STAs in the wireless local area network, in order to make the multiple STAs to identify that the TA response message is returned to which STA, an identifier of the STA may be carried in the TA response message returned from the AP to the STA. Specifically, the identifier of the STA includes but not limited to a MAC address corresponding to the STA, and specific contents of the identifier for the STA are not limited in the embodiment of the present application.

In addition, TA response messages returned from the AP to different STAs may be distinguished in designing the TA response messages. For example, if TA response messages returned from the AP to different STAs may form a sequence, the TA response messages sent from the AP to different STAs may be distinguished by the sequence design method.

In 403, the STA receives the TA response message returned by the AP and measures time alignment information based on a time instant when the TA request message is sent, a time instant when the TA response message returned by the AP is received, and the FT.

In this step, after receiving the TA response message returned by the AP, the STA measurements the time alignment information based on a time instant when the TA response message returned by the AP is received, a time instant when the TA request message is sent, and the FT. In a specific implementation, the way for measuring the time alignment information is not limited in the embodiment, which may include but not limited to measuring the time alignment information according to the following formula:

$$T = t1 - t2 - FT;$$

where T indicates the measured time alignment information, t1 indicates the time instant when the TA response message returned by the AP is received by the STA, t2 indicates the time instant when the TA request message is sent by the STA, and FT indicates the known fixed time period.

Figure 5:
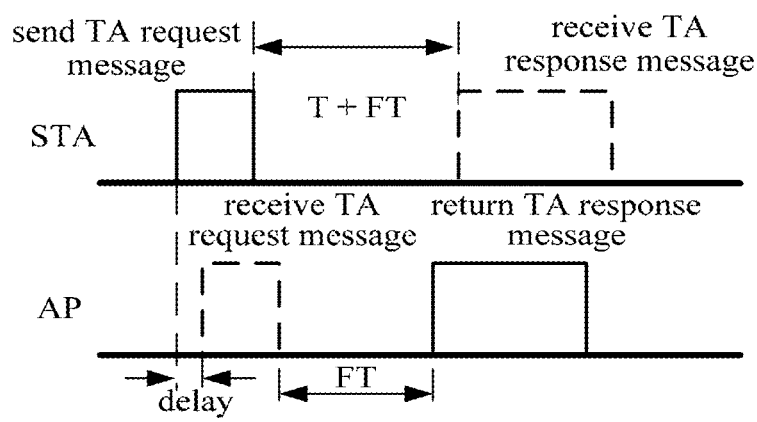
FIG. 5 is a schematic diagram showing a process of measuring time alignment information according to the second embodiment of the present application.

FIG. 5 is a schematic diagram showing a process of measuring the time alignment information by an interaction between an STA and an AP. The interaction process is that: the STA sends a TA request message to the AP; the TA request message is transmitted through the wireless local area network for a time period and then is received by the AP; the AP returns a TA response message to the STA after an FT; and after receiving the TA response message returned by the AP, the STA measurements and obtains the time alignment information based on the time instant when the TA response message is received, the time instant when the TA request message is sent, and the FT. It should be noted that, in the process of measuring the time alignment information by an interaction between the AP and the STA as shown in FIG. 5, a message in a solid line block indicates a message sent by an object, and a message in a dotted line block indicates a message received by the object. For example, the TA request message is sent by the STA, which thus is indicated by a solid line block at the STA side. Similarly, the TA request message sent by the STA is received by the AP, which thus is indicated by a dotted line block at the AP side. The stipulation adapts to all diagrams showing a process of measuring time alignment information by an interaction between the AP and the STA in all subsequent embodiments, which is not described later.

In 404, the STA adjusts a timing advance of a signal transmission based on the measured time alignment information.

In this step, after measuring and obtaining the time alignment information, the STA adjusts a timing advance of a signal transmission based on the measured time alignment information when the STA sends an uplink signal to the AP next time, i.e., the STA adjusts the TA using the measured time alignment information. The timing advance for sending the uplink signal from the STA to the AP is adjusted, such that uplink signals sent by different STAs and received by the AP occupy different time slots in the AP, thereby reducing interference among the uplink signals sent from different STAs to the AP.

With the method according to the embodiment of the present application, the STA measurements and obtains the time alignment information based on the sent message and the received message, and adjusts the timing advance for sending the signal from the STA to the AP based on the time alignment information, such that the STA can adjust the timing advance of the signal transmission in the case of limited time-frequency resources, and thereby reducing interference among signals sent from different STAs to the AP.

Third Embodiment

Figure 6:
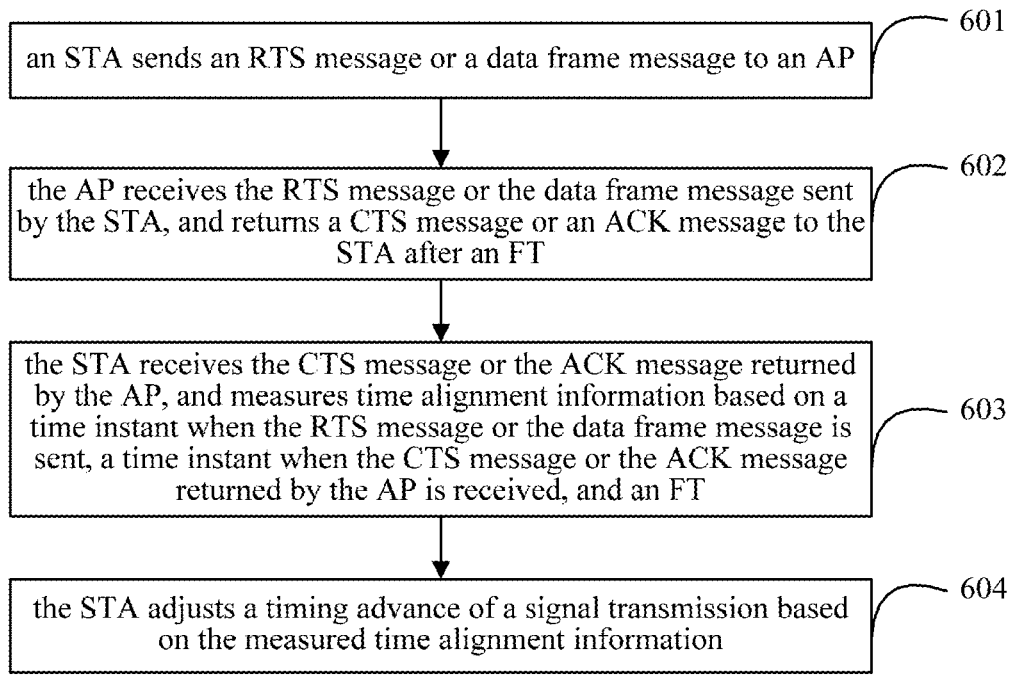
FIG. 6 is a flowchart of a method for adjusting a timing advance according to a third embodiment of the present application.

In conjunction with the content of the first embodiment, a method for adjusting a timing advance is provided according to an embodiment of the present application. The method may be applied to the wireless local area network shown in FIG. 1. In order to facilitate illustration, the method according to the embodiment of the present application is described by assuming that an STA initiates to adjust a timing advance, an uplink message sent from the STA to an AP is an RTS (Request to Send) message or a data frame message, and a downlink message returned from the AP to the STA is a CTS (Clear to Send) message or an ACK (Acknowledge) message. Referring to FIG. 6, a flow of the method includes the follows.

In 601, an STA sends an RTS message or a data frame message to an AP.

In this step, the STA sends the RTS message or the data frame message to the AP after obtaining a time-frequency resource by competition. A competition way for obtaining the time-frequency resource by the STA is not limited in the embodiment of the present application, and the conventional competing ways may be adopted in a specific implementation. In addition, the RTS message or the data frame message may be sent in a form of a frame, which is not limited in the embodiment of the present application. The STA sends the RTS message or the data frame message to the AP, such that time alignment information is measured based on a time different between a time instant when the message is sent and a time instant when the message is received in subsequent steps.

The wireless local area network includes multiple STAs. In order to make the AP to identify the STA which sends the RTS message or the data frame message, an identifier of the STA may be carried in the RTS message or the data frame message sent from the STA to the AP. Specifically, the identifier of the STA includes but not limited to a MAC address corresponding to the STA, and specific contents of the identifier of the STA are not limited in the embodiment of the present application. Alternatively, RTS messages or data frame messages sent by different STAs may be distinguished in designing the RTS messages or data frame messages. For example, if RTS messages or data frame messages sent by different STAs may form a sequence, the RTS messages or data frame messages sent by different STAs may be distinguished by a sequence designing method.

In addition, in the embodiment of the present application, one AP communicates with multiple STAs, and thus the AP does not need to be identified. However, in the case of multiple APs in one wireless local area network, an identifier for distinguishing different APs is carried in the RTS message or the data frame message sent from the STA to the AP, which is configured to identify different APs. Similarly, the identifier for identifying the AP includes but not limited to a MAC address corresponding to the AP, and specific contents of the identifier for the AP are not limited in the embodiment of the present application.

In 602, the AP receives the RTS message or the data frame message sent by the STA, and returns a CTS message or an ACK message to the STA after an FT.

In one local area network, one AP may communicate with multiple STAs and the AP needs to return CTS messages or ACK messages to respective STAs at different time slots in response to the RTS messages or the data frame messages sent by different STAs, hence the AP distributes particular time slots to return CTS messages or ACK messages to respective STAs. That is, once receiving the RTS message or the data frame message sent by the STA, the AP returns the CTS message or the ACK message to the STA after the FT. The FT may be any time duration, and a size of the FT is not limited in the embodiment of the present application. The FT may be set by the AP negotiating with the STA in advance, or may be determined by the AP. If the FT is determined by the AP, the FT is carried in the CTS message or the ACK message returned from the AP to the STA.

In the embodiment of the present application, the CTS message or the ACK message may be sent in a form of a frame, which is not limited in the embodiment of the present application. In addition, due to multiple STAs in the wireless local area network, in order to make the multiple STAs to identify that the AP returns the CTS message or the ACK message to which STA, an identifier of the STA may be carried in the CTS message or the ACK message returned from the AP to the STA. Specifically, the identifier of the STA includes but not limited to a MAC address corresponding to the STA, and specific contents of the identifier for the STA are not limited in the embodiment of the present application.

In addition, the CTS messages or ACK messages returned from the AP to different STAs may be distinguished in designing the CTS messages or the ACK messages. For example, if the CTS messages or ACK messages returned from the AP to different STAs may form a sequence, the CTS messages or ACK messages sent from the AP to different STAs may be distinguished by the sequence design method.

In 603, the STA receives the CTS message or the ACK message returned by the AP, and measures time alignment information based on a time instant when the RTS message or the data frame message is sent, a time instant when the CTS message or the ACK message returned by the AP is received, and the FT.

In this step, after receiving the CTS message or the ACK message returned by the AP, the STA measurements the time alignment information based on a time instant when the CTS message or the ACK message returned by the AP is received, a time instant when the RTS message or the data frame message is sent and the FT in many ways, which are not limited in the embodiment of the present application. In a specific implementation, the time alignment information may be measured according to the following formula:

$$T=t1-t2-FT;$$

where T indicates the measured time alignment information, t1 indicates the time instant when the CTS message or the ACK message returned by the AP is received by the STA, t2 indicates the time instant when the RTS message or the data frame message is sent by the STA, and FT indicates the known fixed time period.

Figure 7:
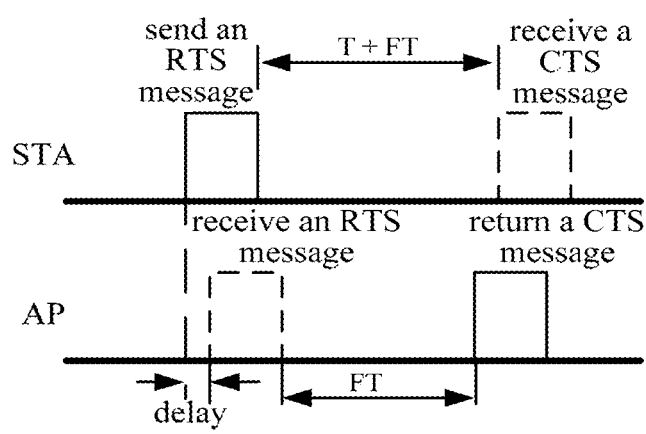
FIG. 7 is a schematic diagram showing a process of measuring time alignment information according to the third embodiment of the present application.

FIG. 7 is a schematic diagram showing a process for measuring time alignment information by an interaction between an STA and an AP. The interaction process is that: the STA sends an RTS message to the AP; the RTS message is transmitted through the wireless local area network for a time period and then is received by the AP; the AP returns the CTS message to the STA after an FT; and after receiving the CTS message returned by the AP, the STA measurements and obtains the time alignment information based on the time instant when the CTS message is received, the time instant when the RTS message is sent, and the FT.

Figure 8:
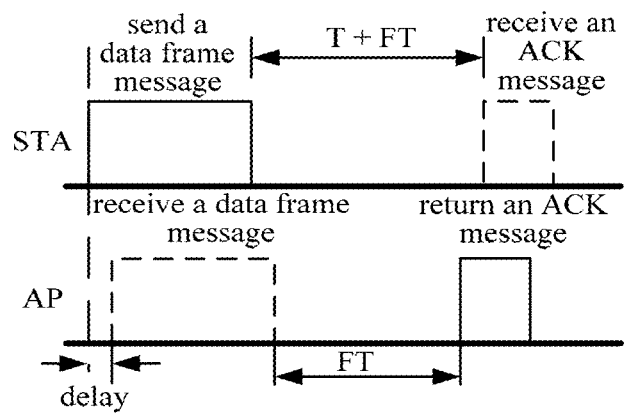
FIG. 8 is a schematic diagram showing a process of measuring time alignment information according to the third embodiment.

FIG. 8 is a schematic diagram showing a process for measuring time alignment information by an interaction between the STA and the AP. The interaction process is that: the STA sends a data frame message to the AP; the data frame message is transmitted through the wireless local area network for a time period and then is received by the AP; the AP returns the ACK message to the STA after an FT; and after receiving the ACK message returned by the AP, the STA measurements and obtains the time alignment information based on the time instant when the ACK message is received, the time instant when the data frame message is sent, and the FT.

In 604, the STA adjusts a timing advance of a signal transmission based on the measured time alignment information.

In this step, after measuring and obtaining the time alignment information, the STA adjusts a timing advance of a signal transmission based on the measured time alignment information when the STA sends an uplink signal to the AP next time, i.e., the STA adjusts the TA using the measured time alignment information. The timing advance for sending the uplink signal from the STA to the AP is adjusted, such that uplink signals sent by different STAs and received by the AP occupy different time slots in the AP, and thereby reducing interference among uplink signals sent from different STAs to the AP.

It should be noted that, the method according to the embodiment of the present application is described by taking that the uplink message is the RTS message or the data frame message and the downlink message is the CTS message or the ACK message during the interaction between the AP and the STA as example. In an actual application process, the time alignment information may be measured using an immediate block response message such as a BAR (Block Acknowledge Request)/BA (Block Acknowledge); and a delay response message such as BRA/ACK, BA/ACK, association response/ACK, reassociation response/ACK, probe response/ACK and data frame/ACK. The specific process for measuring the time alignment information is the same as that in the method according to the embodiment of the present application, which is not described herein.

With the method according to the embodiment of the present application, the STA measurements and obtains the time alignment information based on the sent message and the received message, and adjusts a timing advance for sending a signal from the STA to the AP based on the time alignment information, such that the STA can adjust the timing advance of the signal transmission in the case of limited time-frequency resources, and thereby reducing interference among signals sent from different STAs to the AP.

Fourth Embodiment

Figure 9:
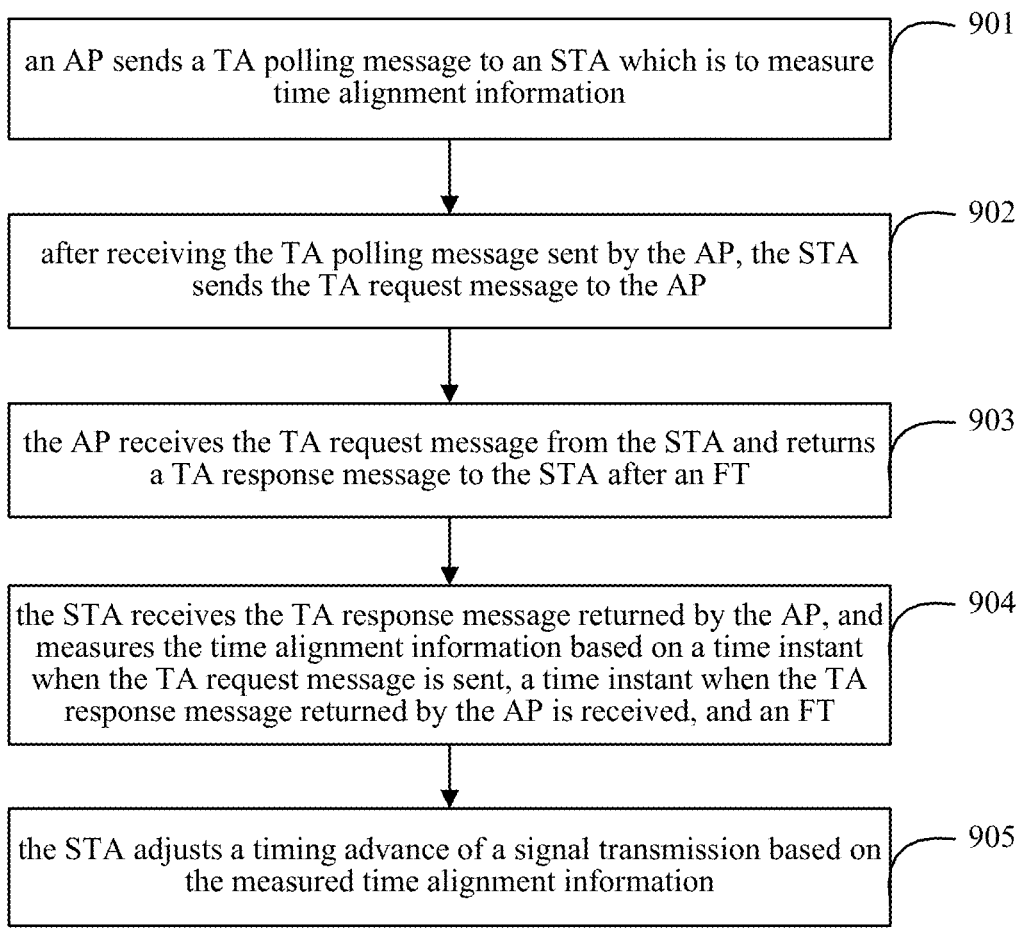
FIG. 9 is a flowchart of a method for adjusting a timing advance according to a fourth embodiment of the present application.

In conjunction with the content of the first embodiment, a method for adjusting a timing advance is provided according to an embodiment of the present application. The method may be applied to the wireless local area network shown in FIG. 1. In order to facilitate illustration, the method according to the embodiment of the present application is described by assuming that an AP sends a TA polling message to an STA firstly, to trigger the STA to initiate to measure time alignment information, an uplink message sent from the STA to the AP is a TA request message, and a downlink message returned from the AP to the STA is a TA response message. Referring to FIG. 9, a flow of the method includes the follows.

In 901, an AP sends a TA polling message to an STA which is to measure time alignment information.

In this step, in order to trigger the STA to initiate to measure the time alignment information, the AP sends the TA polling message to the STA firstly. The TA polling message may be sent in a form of a data frame, which is not limited in the embodiment of the present application. In addition, the wireless local area network includes multiple STAs. In order to make the multiple STAs to identify that the AP sends the TA polling message to which STA, an identifier of the STA may be carried in the TA polling message sent from the AP to the STA. Specifically, the identifier of the STA includes but not limited to a MAC address corresponding to the STA. Specific contents of the identifier of the STA are not limited in the embodiment of the present application. Alternatively, TA polling messages sent from the AP to different STAs may be distinguished in designing the TA polling messages. For example, if the TA polling messages sent from the AP to different STAs may form a sequence, the TA polling messages sent to different STAs may be distinguished by the sequence design method.

In 902, after receiving the TA polling message sent by the AP, the STA sends a TA request message to the AP.

In this step, the STA may determine to measure time alignment information after receiving the TA polling message sent by the AP, and hence the STA sends the TA request message to the AP to initiate to measure the time alignment information. The principle for sending the TA request message from the STA to the AP is the same as that in step 401 of the second embodiment, and specific contents may be referred to the description in step 401 of the second embodiment, which is not described herein.

In 903, the AP receives the TA request message from the STA and returns a TA response message to the STA after an FT.

The principle of this step is the same as that in step 402 of the second embodiment, and specific contents may be referred to the description in step 402 of the second embodiment, which is not described here.

In 904, the STA receives the TA response message returned by the AP, and measures the time alignment information based on a time instant when the TA request message is sent, a time instant when the TA response message returned by the AP is received, and the FT.

The principle of this step is the same as that in step 403 of the second embodiment, and specific contents may be referred to step 403 of the second embodiment, which is not described herein.

Figure 10:
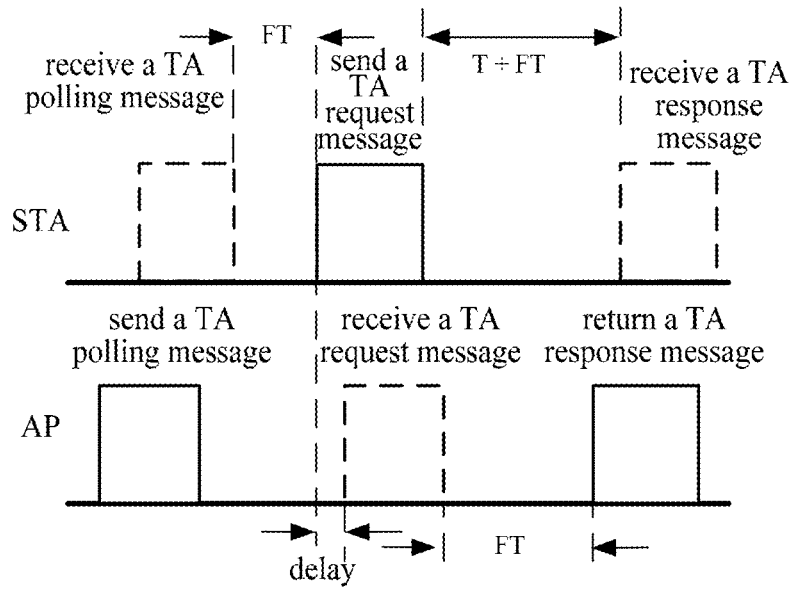
FIG. 10 is a schematic diagram showing a process of measuring time alignment information according to the fourth embodiment of the present application.

FIG. 10 is a schematic diagram showing a process for measuring time alignment information by an interaction between an STA and an AP. The specific interaction process is that: the AP sends a TA polling message to the STA, to trigger the STA to initiate to measure the time alignment information; after receiving the TA polling message, the STA sends a TA request message to the AP; the request message is transmitted through the wireless local area network for a time period and then is received by the AP; subsequently, the AP returns a TA response message to the STA after an FT; and finally, the STA receives the TA response message returned by the AP. The STA measurements and obtains the time alignment information based on the time instant when the TA response message is received, the time instant when the TA request message is sent, and the FT.

In 905, the STA adjusts a timing advance of a signal transmission based on the measured time alignment information.

In this step, after measuring and obtaining the time alignment information, the STA adjusts a timing advance of a signal transmission based on the measured time alignment information when the STA sends an uplink signal to the AP next time, i.e., the STA adjusts the TA using the measured time alignment information. The timing advance for sending the uplink signal from the STA to the AP is adjusted, such that uplink signals sent by different STAs and received by the AP occupy different time slots in the AP, and thereby reducing interference among uplink signals sent from different STAs to the AP.

With the method according to the embodiment of the present application, the STA measurements to obtain the time alignment information based on the sent message and the received message, and adjusts the timing advance for sending the signal from the STA to the AP based on the time alignment information, such that the STA can adjust the timing advance of the signal transmission in the case of limited time-frequency resources, and thereby reducing interference among signals sent from different STAs to the AP.

Fifth Embodiment

Figure 11:
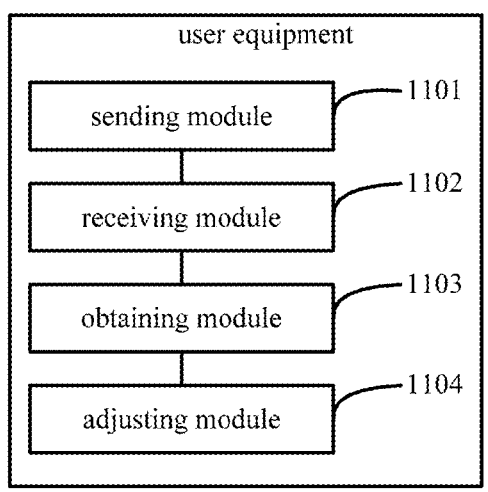
FIG. 11 is a schematic structural diagram of user equipment according to a fifth embodiment of the present application.

A user equipment is provided according to an embodiment of the present application. The user equipment may be applied to a wireless local area network, to achieve functions of the user equipment mentioned in the method for adjusting a timing advance according to any one of the first embodiment to the fourth embodiment. Referring to FIG. 11, the user equipment includes the follows.

A sending module 1101 is configured to send an uplink message to an access point AP.

A receiving module 1102 is configured to receive a downlink message returned by the AP.

An obtaining module 1103 is configured to obtain time alignment information based on a time instant when the uplink message is sent, a time instant when the downlink message is received and a fixed time period during which the downlink message is returned by the AP.

An adjusting module 1104 is configured to adjust a timing advance of a signal transmission based on the time alignment information.

In another preferred embodiment, the obtaining module 1103 is configured to obtain the time alignment information according to a formula T=t1t2−FT, where T indicates time alignment information obtained by a measurement, t1 indicates the time instant when the downlink message returned by the AP is received, t2 indicates the time instant when the uplink message is sent to the AP, and FT indicates a fixed time interval when the downlink message is returned by the AP.

In another preferred embodiment, the uplink message sent from the sending module 1101 to the AP is a timing advance TA request message, and the downlink message returned by the AP and received by the receiving module 1102 is a TA response message.

Alternatively, the uplink message sent from the sending module 1101 to the AP is a request-to-send RTS message, and the downlink message returned by the AP and received by the receiving module 1102 is a clear-to-send CTS message.

Alternatively, the uplink message sent from the sending module 1101 to the AP is a data frame message, and the downlink message returned by the AP and received by the receiving module 1102 is an acknowledge ACK message.

In another preferred embodiment, the receiving module 1102 is further configured to receive a TA polling message sent by the AP, and then the sending module sends a TA request message to the AP based on the TA polling message.

According to the embodiment of the present application, the user equipment measures and obtains the time alignment information based on the sent message and the received message, and adjusts the timing advance for sending the signal from the STA to the AP based on the time alignment information, such that the STA can adjust the timing advance of the signal transmission in the case of limited time-frequency resources, and thereby reducing interference among signals sent from different STAs to the AP.

Sixth Embodiment

Figure 12:
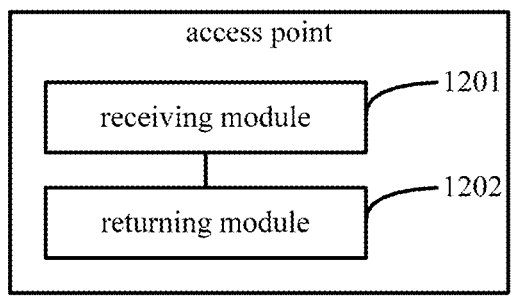
FIG. 12 is a schematic structural diagram of an access point according to a sixth embodiment of the present application.

An access point is provided according to an embodiment of the present application. The access point may be applied to a wireless local area network, to achieve functions of the AP mentioned in the method for adjusting a timing advance according to any one of the first embodiment to the fourth embodiment. Referring to FIG. 12, the AP includes the follows.

A receiving module 1201 is configured to receive an uplink message from user equipment STA.

A returning module 1202 is configured to return a downlink message to the STA, such that the STA obtains time alignment information based on a time instant when the uplink message is sent, a time instant when the downlink message is returned to the STA and a fixed time period during which the downlink message is returned to the STA; and then adjusts a timing advance of a signal transmission based on the time alignment information.

In another preferred embodiment, the uplink message sent by the user equipment STA and received by the receiving module 1201 is a timing advance TA request message, and the downlink message returned from the returning module 1202 to the STA is a TA response message.

Alternatively, the uplink message sent by the STA and received by the receiving module 1201 is a request-to-send RTS message, and the downlink message returned from the returning module 1202 to the STA is a clear-to-send CTS message.

Alternatively, the uplink message sent by the STA and received by the receiving module 1201 is a data frame message, and the downlink message returned from the returning module 1202 to the STA is an acknowledge ACK message.

In another preferred embodiment, the returning module 1202 is further configured to send a TA polling message to the STA, and then the STA sends the TA request message based on the TA polling message.

According to the embodiment of the present application, the access point returns the downlink message to the STA after receiving the uplink message sent by the STA, and then the STA measurements and obtains the time alignment information based on the sent message and the received message; and the STA adjusts the timing advance for sending the signal from the STA to the AP based on the time alignment information, such that the STA can adjust the timing advance of the signal transmission in the case of limited time-frequency resources, and thereby reducing interference among signals sent from different STAs to the AP.

Seventh Embodiment

Figure 13:
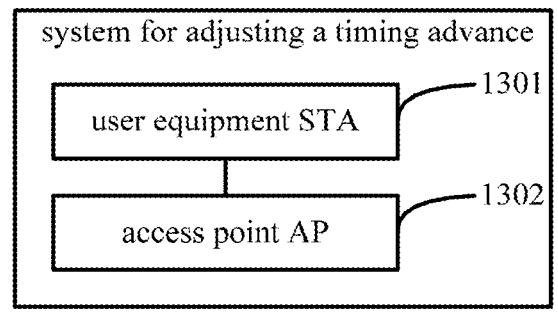
FIG. 13 is a schematic structural diagram of a system for adjusting a timing advance according to a seventh embodiment of the present application.

A system for adjusting a timing advance is provided according to an embodiment of the present application. The system may be applied to a wireless local area network. Referring to FIG. 13, the system includes user equipment STA 1301 and an access point AP 1302.

The STA 1301 is the STA according to the fifth embodiment, and specific contents of the STA 1301 may be referred to the description in the fifth embodiment, which are not described herein.

The AP 1302 is the AP according to the sixth embodiment, and specific contents of the AP 1302 may be referred to the sixth embodiment, which is not described herein.

According to the embodiment of the present application, the system measures and obtains the time alignment information based on the uplink message sent by the STA and the received downlink message returned by the AP, and adjusts the timing advance for sending the signal from the STA to the AP based on the time alignment information, such that the STA can adjust the timing advance of the signal transmission in the case of limited time-frequency resources, and thereby reducing interference among signals sent from different STAs to the AP.

Eighth Embodiment

Figure 14:
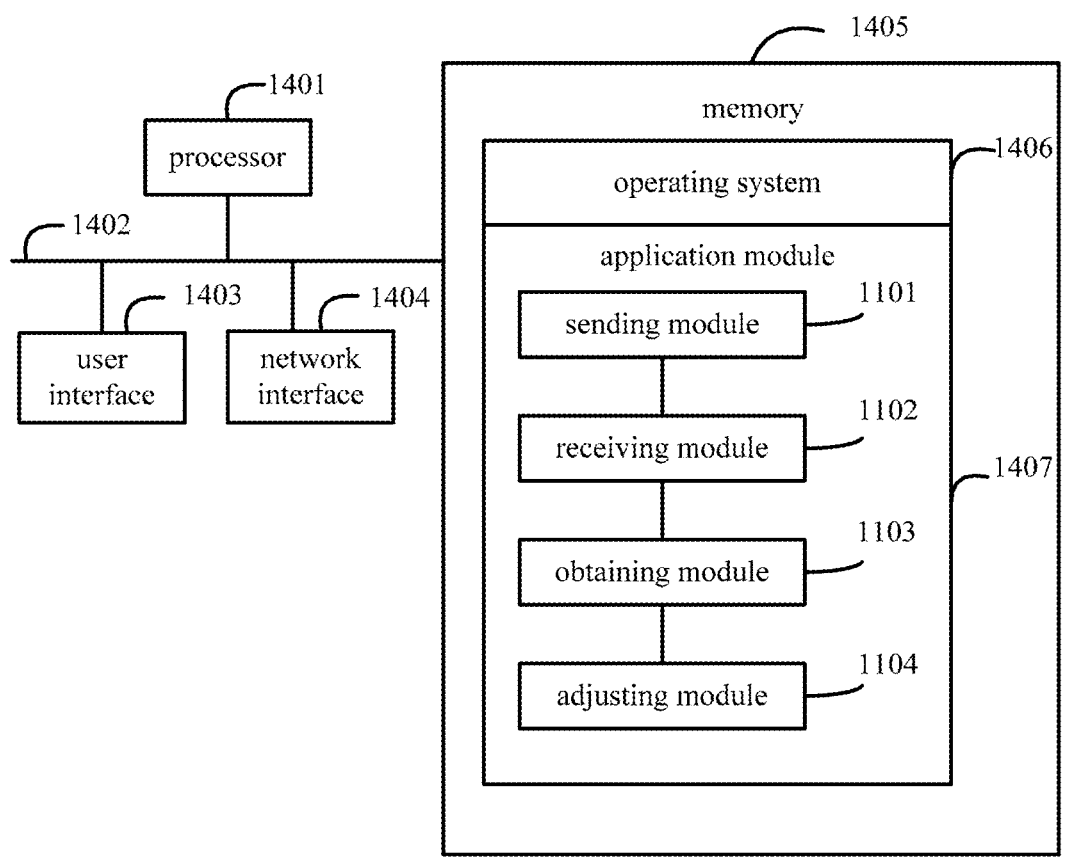
FIG. 14 is a schematic structural diagram of user equipment according to an eighth embodiment of the present application.

FIG. 14 is a schematic structural diagram of user equipment according to an embodiment. The user equipment includes at least one processor (1401) for example a CPU, at least one network interface 1404 or other user interfaces 1403, a memory 1405 and at least one communication bus 1402. The communication bus 1402 is used to perform connection communication between the devices. The user interface 1403 may be a display, a keyboard or a pointing device. The memory 1405 may include a high speed Ram memory or a non-volatile memory (non-volatile memory) for example at least one magnetic disk memory. Optionally, the memory 1405 may include at least one storage device far away from the CPU 1402. In some embodiments, the memory 1405 stores modules, data structures, subsets thereof or supersets thereof.

The operating system 1406 includes various types of programs for performing respective basic services and processing tasks based on hardware.

The application module 1407 includes a sending module 1101, a receiving module 1102, an obtaining module 1103 and an adjusting module 1104. Functions of the above modules may be referred to the description of the operation principle diagram in FIG. 11, which are not described herein.

According to the embodiment of the present application, the user equipment measures and obtains the time alignment information based on the sent message and the received message, and adjusts the timing advance for sending the signal from the STA to the AP based on the time alignment information, such that the STA can adjust the timing advance of the signal transmission in the case of limited time-frequency resources, and thereby reducing interference among signals sent from different STAs to the AP.

Ninth Embodiment

Figure 15:
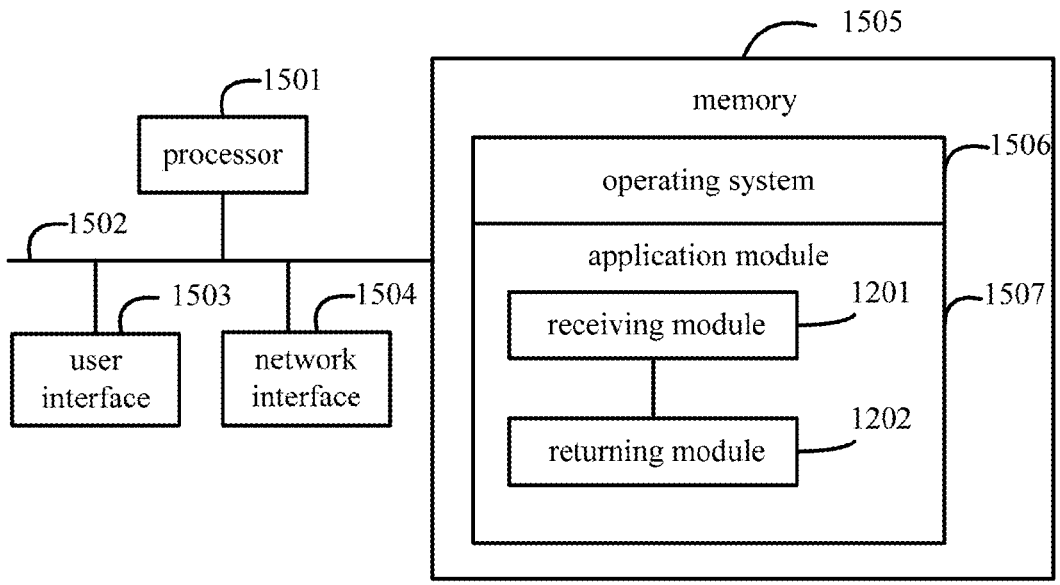
FIG. 15 is a schematic structural diagram of an access point according to a ninth embodiment of the present application.

FIG. 15 is a schematic structural diagram of an access point according to an embodiment. The access point includes at least one processor (1501) for example a CPU, at least one network interface 1504 or other user interfaces 1503, a memory 1505 and at least one communication bus 1502. The communication bus 1502 is used to perform connection communication between the devices. The user interface 1503 may be a display, a keyboard or a pointing device. The memory 1505 may include a high speed Ram memory or a non-volatile memory (non-volatile memory) for example at least one magnetic disk memory. Optionally, the memory 1505 may include at least one storage device far away from the CPU 802. In some embodiments, the memory 1505 stores modules, data structures, subsets thereof or supersets thereof.

The operating system 1506 includes various types of programs for performing respective basic services and processing tasks based on hardware.

The application module 1507 includes a receiving module 1201 and a returning module 1202. Functions of the above modules may be referred to the description of the operation principle diagram in FIG. 12, which are not described herein.

According to the embodiment of the present application, the access point returns the downlink message to the STA after receiving the uplink message sent by the STA, then the STA measurements and obtains the time alignment information based on the message sent by the STA and the message received by the STA; and the access point adjusts the timing advance for sending the signal from the STA to the AP based on the time alignment information, such that the STA can adjust the timing advance of the signal transmission in the case of limited time-frequency resources, and thereby reducing interference among signals sent from different STAs to the AP.

Tenth Embodiment

Figure 16:
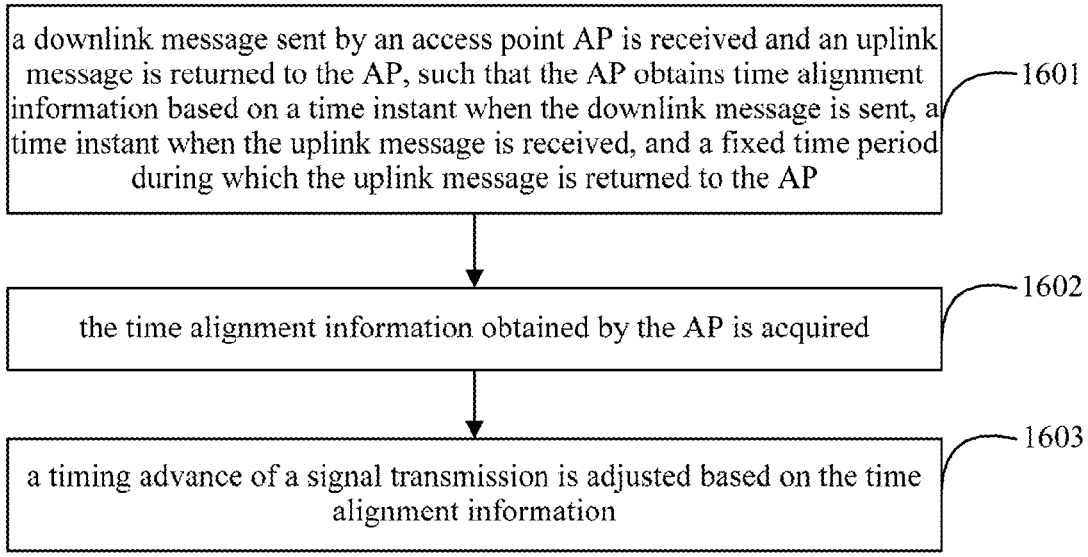
FIG. 16 is a flowchart of a method for adjusting a timing advance according to a tenth embodiment of the present application.

A method for adjusting a timing advance is provided according to an embodiment of the present application. The method may be applied to the wireless local area network as shown in FIG. 1. The method according to the embodiment of the present application is described in detail from an STA side, and it is assumed that an AP measures time alignment information. Referring to FIG. 16, a flow of the method according to the embodiment of the present application includes the follows.

In 1601, a downlink message sent by an access point AP is received and an uplink message is returned to the AP, such that the AP obtains time alignment information based on a time instant when the downlink message is sent, a time instant when the uplink message is received, and a fixed time period during which the uplink message is returned to the AP.

In 1602, the time alignment information obtained by the AP is acquired.

In 1603, a timing advance of a signal transmission is adjusted based on the time alignment information.

Alternatively, the acquiring the time alignment information obtained by the AP includes: receiving a timing advance TA adjusting command sent by the AP and acquiring the time alignment information from the TA adjusting command.

Alternatively, in the method, the downlink message received from the AP is a TA polling message, and the uplink message returned to the AP is a TA sequence message; or the downlink message sent by the AP is a request-to-send RTS message, and the uplink message returned to the AP is a clear-to-send CTS message; or the downlink message sent by the AP is a data frame message, and the uplink message returned to the AP is an acknowledge ACK message; or the downlink message sent by the AP is a downlink message carrying a downlink reference signal, and the uplink message returned to the AP is an uplink message carrying an uplink reference signal.

Alternatively, before receiving a TA polling message from the AP, the method further comprises: sending a TA request message to the AP, wherein the AP sends the TA polling message in response to the TA request message.

Figure 17:
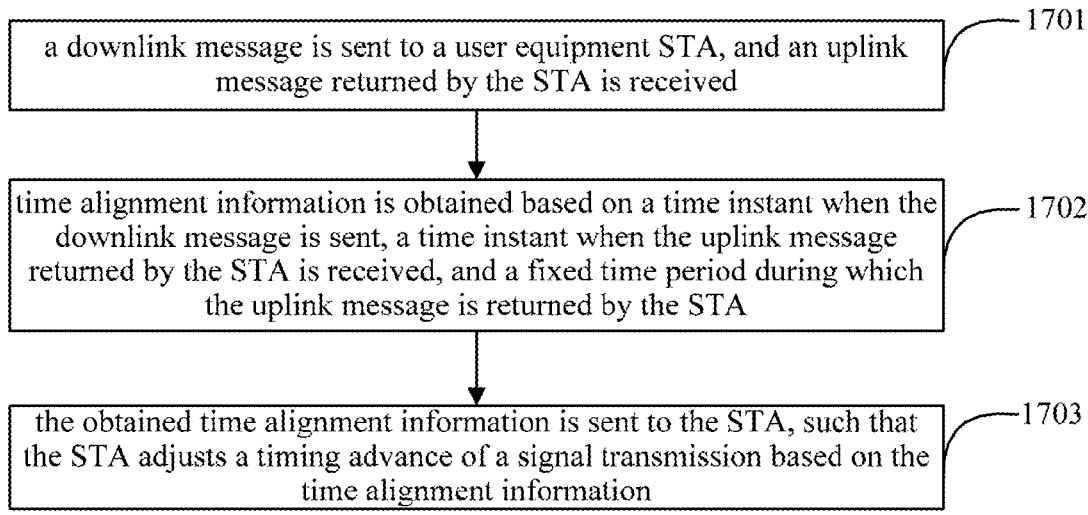
FIG. 17 is a flowchart of another method for adjusting a timing advance according to the tenth embodiment of the present application.

The method according to the embodiment of the present application is described from an AP side and it is assumed that the AP measures time alignment information. Referring to FIG. 17, a flow of the method includes the follows.

In 1701, a downlink message is sent to a user equipment STA, and an uplink message returned by the STA is received.

In 1702, time alignment information is obtained based on a time instant when the downlink message is sent, a time instant when the uplink message returned by the STA is received, and a fixed time period during which the uplink message is returned by the STA.

In 1703, the obtained time alignment information is sent to the STA, such that the STA adjusts a timing advance of a signal transmission based on the time alignment information.

Alternatively, the step 1703 further includes: sending to the STA a timing advance TA adjusting command carrying the time alignment information, wherein the STA adjusts the timing advance of the signal transmission based on the time alignment information carried in the TA adjusting command.

Alternatively, the step 1702 may include obtaining the time alignment information according to a formula T'=t1'−t2'−FT', where T' indicates the time alignment information obtained by a measurement, t1' indicates a time instant when the uplink message returned by the STA is received, t2' indicates a time instant when the downlink message is sent, and FT' indicates a fixed time period during which the uplink message is returned by the STA.

Alternatively, in the method, the downlink message sent to the STA is a TA polling message, and the uplink message returned by the STA is a TA sequence message; or the downlink message sent to the STA is a request-to-send RTS message, and the uplink message returned by the STA is a clear-to-send CTS message; or the downlink message sent to the STA is a data frame message, and the uplink message returned by the STA is an acknowledge ACK message; or the downlink message sent to the STA is a downlink message carrying a downlink reference signal, and the uplink message returned by the STA is an uplink message carrying an uplink reference signal.

Alternatively, before sending a TA polling message to the STA, the method further comprises: receiving a TA request message from the STA, wherein the TA polling message is sent to the STA in response to the TA request message.

According to the embodiment of the present application, the AP measures and obtains the time alignment information based on the sent message and the received message, and sends the time alignment information to the STA, and then the STA adjusts the timing advance for sending the signal from the STA to the AP based on the time alignment information, such than the STA can adjust the timing advance of the signal transmission in the case of limited time-frequency resources, and thereby reducing interference among signals sent from different STAs to the AP.

Eleventh Embodiment

Figure 18:
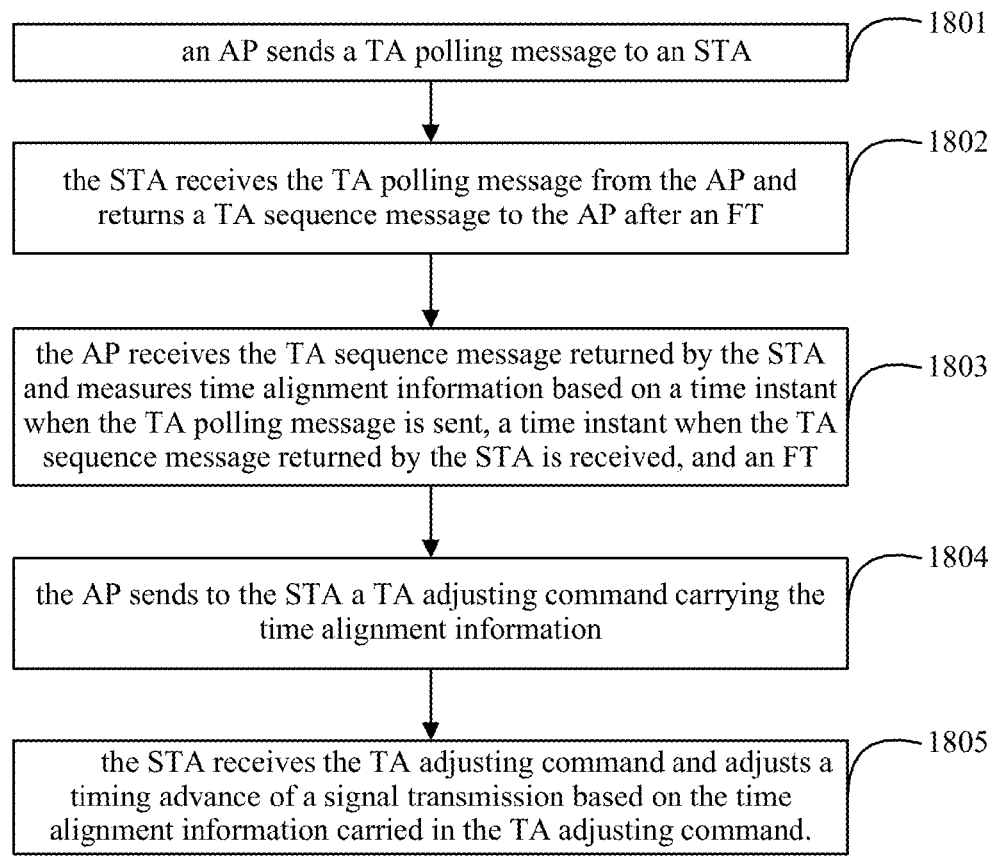
FIG. 18 is a flowchart of a method for adjusting a timing advance according to an eleventh embodiment of the present application.

In conjunction with the content of the tenth embodiment, a method for adjusting a timing advance is provided according to an embodiment of the present application. The method is applied to the wireless local area network as shown in FIG. 1. In order to facilitate illustration, the method according to the embodiment of the present application is described by assuming that an AP initiates to adjust a timing advance, a downlink message sent from the AP to an STA is a TA polling message, and an uplink message returned from the STA to the AP is a TA sequence message. Referring to FIG. 18, a flow of the method according to the embodiment of the present application includes the follows.

In 1801, an AP sends a TA polling message to an STA.

In this step, the TA polling message may be sent in a form of a data frame, which is not limited in the embodiment of the present application. In addition, the wireless local area network includes multiple STAs. In order to make the multiple STAs to identify that the AP sends the TA polling message to which STA, an identifier of the STA may be carried in the TA polling message sent from the AP to the STA. Specifically, the identifier of the STA includes but not limited to a MAC address corresponding to the STA, and specific contents of the identifier of the STA are not limited in the embodiment of the present application. Alternatively, the TA polling messages sent from the AP to different STAs may be distinguished in designing the TA polling messages. For example, if the TA polling messages sent from the AP to different STAs may form a sequence, the TA polling messages sent to different STAs may be distinguished by the sequence design method.

In addition, in the embodiment of the present application, one AP communicates with multiple STAs, and thus the AP does not need to be identified. However, in a case that one wireless local area network includes multiple APs, when the AP sends the TA polling message to the STA, in order to make the STA to identify that the TA polling message is sent by which AP, an identifier of the AP may be carried in the TA polling message. The identifier of the AP is configured to make the STA identify an AP which sends the TA polling message. The identifier of the AP includes but not limited to a MAC address corresponding to the AP, and specific contents of the identifier of the AP are not limited in the embodiment of the present application.

It should be noted that, the AP may send a single TA polling message to the STA, or may send a TA polling message to the STA periodically. The TA polling message may be sent in a form of a data frame, which is not limited in the embodiment of the present application. The way for sending the TA poling message is not limited herein. If the TA polling message is sent periodically, a period for sending the TA polling message is not limited in the embodiment of the present application. In order to facilitate illustration, in subsequent steps pf the embodiment, it is illustrated by assuming that the AP sends a single TA polling message to the STA.

In 1802, the STA receives the TA polling message from the AP and returns a TA sequence message after an FT.

In this step, the FT may be any time duration, and a size of the FT is not limited in the embodiment of the present application. The FT may be set by the AP negotiating with the STA in advance, or may be determined by the STA. If the FT is determined by the STA, the FT is carried in the TA sequence message returned from the STA to the AP.

In the embodiment of the present application, the TA sequence message may be sent in a form of a data frame, which is not limited in the embodiment of the present application. In addition, the wireless local area network includes multiple STAs. In order to make the AP to identify that the TA sequence message is returned by which STA, an identifier of the STA may be carried in the TA sequence message returned from the STA to the AP. The identifier of the STA includes but not limited to a MAC address corresponding to the STA, and specific contents of the identifier of the STA is not limited in the embodiment of the present application. Alternatively, the TA sequence messages returned from different STAs to the AP may be distinguished in designing the TA sequence messages. For example, if the TA sequence messages returned from different STAs to the AP may form a sequence, the TA sequence messages sent from different STAs to the AP may be distinguished by the sequence design method.

In addition, in the embodiment of the present application, one AP communicates with multiple STAs, and thus the AP does not need to be identified. However, in a case of multiple APs in one wireless local area network, the STA needs to identify that the TA polling message is sent by which AP when receiving the TA polling message sent by the AP. The way for the STA identifying the AP, which sends the TA polling message, is not limited in the embodiment of the present application. In a specific implementation, if an identifier of the AP is carried in the TA polling message sent by the AP, the STA may identify the AP based on the identifier of the AP carried in the TA polling message.

In 1803, the AP receives the TA sequence message returned by the STA; and measures time alignment information based on a time instant when the TA polling message is sent, a time instant when the TA sequence message returned by the STA is received, and an FT.

In this step, after receiving the TA sequence message returned by the STA, the AP distinguishes different STAs, and then measures time alignment information corresponding to different STAs based on the time instant when the TA polling message is sent, the time instant when the TA sequence message returned by the STA is received, and the FT. In a specific implementation, the way for measuring the time alignment information by the AP is not limited in the embodiment, and the way includes but not limited to measuring the time alignment information according to the following formula:

$$T'=t1'-t2'-FT'$$

where T' indicates time alignment information obtained by a measurement, t1' indicates the time instant when the TA sequence message returned by the STA is received by the AP, t2' indicates the time instant when the TA polling message is sent by the AP, and FT' indicates the known fixed time period.

Figure 19:
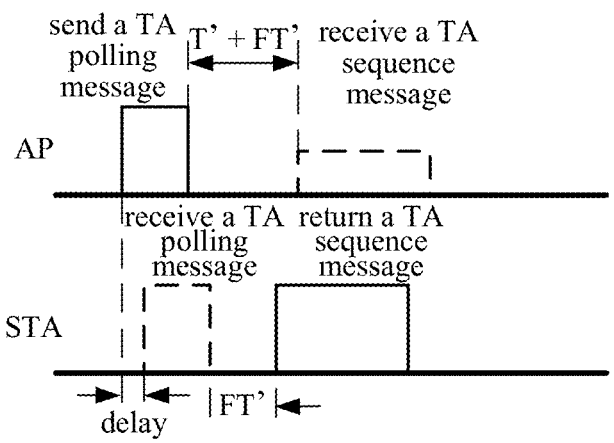
FIG. 19 is a schematic diagram showing a process of measuring time alignment information according to the eleventh embodiment of the present application.

FIG. 19 is a schematic diagram showing a process for measuring time alignment information by an interaction between an AP and an STA. In the interaction process as shown in FIG. 19, the AP sends a single TA polling message to the STA. The interaction process is that: the AP sends the single TA polling message to the STA; the single TA polling message is transmitted through the wireless local area network for a time period and then is received by the STA; the STA returns a TA sequence message to the AP after an FT; and after receiving the TA sequence message returned by the STA, the AP measures and obtains the time alignment information based on the time instant when the TA sequence message returned by the STA is received, the time instant when the TA polling message is sent, and the FT.

Figure 20:
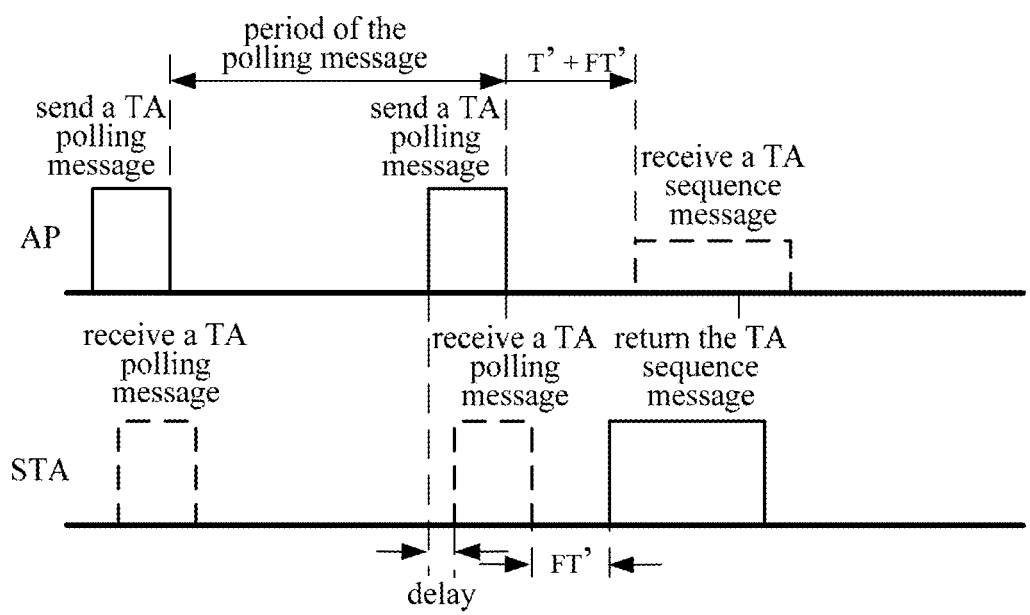
FIG. 20 is a schematic diagram showing a process of measuring time alignment information according to the eleventh embodiment of the present application.

FIG. 20 is a schematic diagram showing a process for measuring time alignment information by an interaction between an AP and an STA. In the interaction process as shown in FIG. 20, the AP sends a TA polling message to the STA periodically. The interaction process is that: the AP sends the TA polling message to the STA periodically; the TA polling message sent in a certain period is received by the STA; the STA returns a TA sequence message to the AP after an FT; and after receiving the TA sequence message returned by the STA, the AP measures and obtains the time alignment information based on the time instant when the TA sequence message returned by the STA is received, the time instant when the TA polling message in the certain period among the periodically sent TA polling messages is received by the STA, and the FT.

In 1804, the AP sends to the STA a TA adjusting command carrying the time alignment information.

In this step, the TA adjusting command sent from the AP to the STA carries the time alignment information. Then, the STA adjusts a timing advance of a signal transmission based on the time alignment information carried in the received TA adjusting command. In addition, the TA adjusting command further carries an identifier of the STA. The identifier of the STA carried in the TA adjusting command includes but not limited to a MAC address corresponding to the STA, and specific contents of the identifier of the STA is not limited in the embodiment of the present application.

In addition, the TA adjusting command further includes an instruction for distinguishing new time alignment information and updated time alignment information. Specifically, the new time alignment information indicates time alignment information of a large range in a more bit number, and the updated time alignment information indicates time alignment information relative to a current uplink sending time instant in a less bit number.

In 1805, the STA receives the TA adjusting command and adjusts a timing advance of a signal transmission based on the time alignment information carried in the TA adjusting command.

In this step, after receiving the TA adjusting command sent by the AP, the STA adjusts a timing advance of a signal transmission based on the time alignment information carried in the TA adjusting command when the STA sends an uplink signal to the AP next time, i.e., the STA adjusts the TA using the time alignment information carried in the TA adjusting command.

With the method according to the embodiment of the present application, the AP measures and obtains the time alignment information based on the sent message and the received message, and sends the time alignment information to the STA. The STA adjusts the timing advance for sending the signal from the STA to the AP based on the time alignment information. In this way, the STA can adjust the timing advance of the signal transmission in the case of limited time-frequency resources, thereby reducing interference among signals sent from different STAs to the AP.

Twelfth Embodiment

Figure 21:
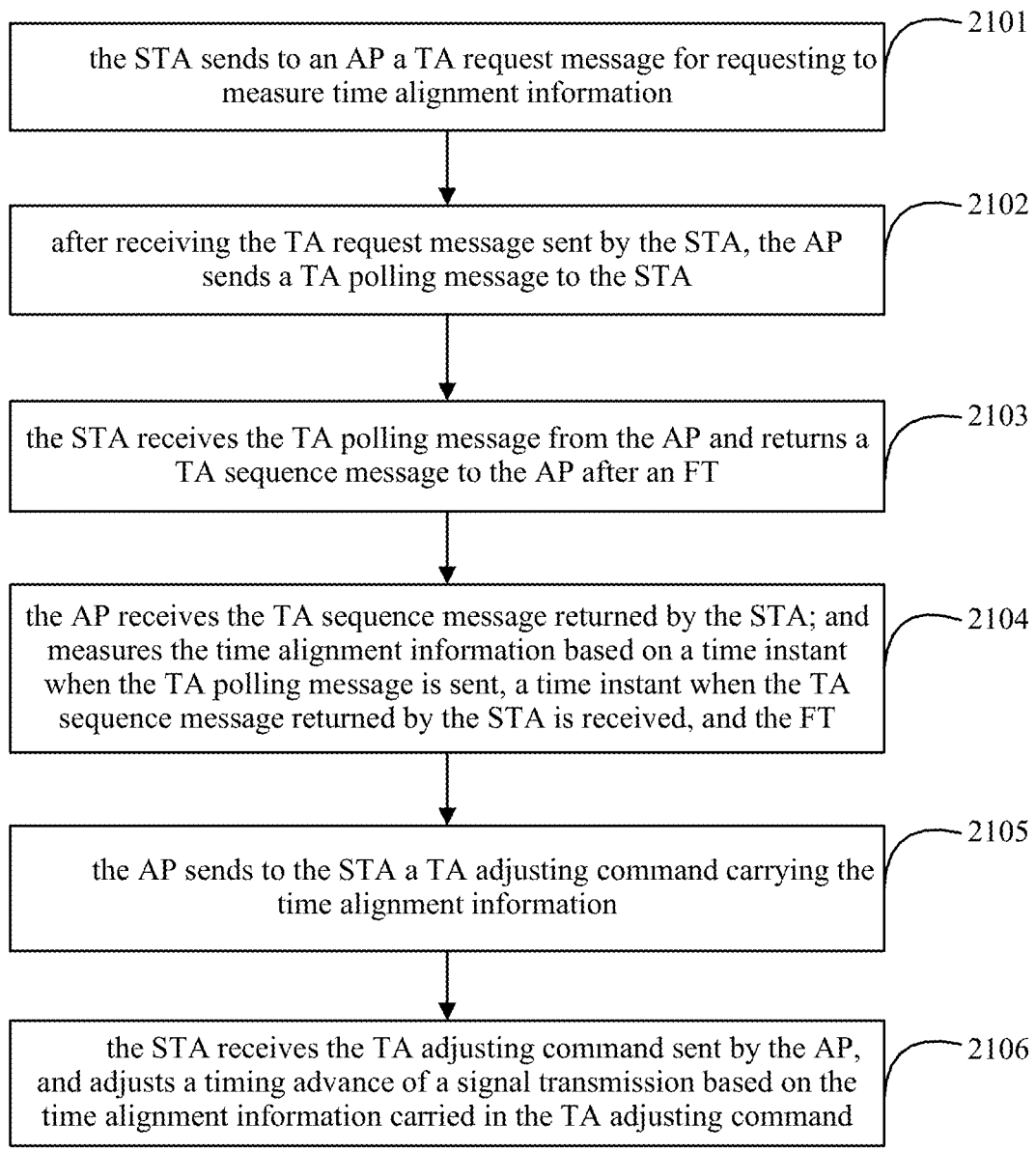
FIG. 21 is a flowchart of a method for adjusting a timing advance according to a twelfth embodiment of the present application.

In conjunction with the content of the tenth embodiment, a method for adjusting a timing advance is provided according to an embodiment of the present application. The method may be applied to a wireless local area network. In order to facilitate illustration, in the embodiment of the present application, the method according to the embodiment of the present application is described by assuming that an STA sends a TA request signal to an AP, to trigger the AP to initiate to measure time alignment information, a downlink message sent from the AP to the STA is a TA polling message, and an uplink message returned from the STA to the AP is a TA sequence message. Referring to FIG. 21, a flow of the method according to the embodiment of the present application includes the follows.

In 2101, an STA sends to an AP a TA request message for requesting to measure time alignment information.

In this step, in order to trigger the AP to initiate to measure the time alignment information, the STA sends the TA request message to the AP after obtaining a time-frequency resource by competition. A competition way for obtaining the time-frequency resource by the STA is not limited in the embodiment of the present application, and the conventional competing ways may be adopted in a specific implementation. In this step, the TA request message may be sent in a form of a data frame, which is not limited in the embodiment of the present application.

In addition, the wireless local area network includes multiple STAs. In order to make the AP to identify that the TA request message is sent by which STA, an identifier of the STA may be carried in the TA request message sent from the STA to the AP. Specifically, the identifier of the STA includes but not limited to a MAC address corresponding to the STA, and specific contents of the identifier of the STA are not limited in the embodiment of the present application. Alternatively, TA request messages sent from different STAs to the AP may be distinguished in designing the TA request message. For example, if the TA request messages sent from different STAs to the AP may form a sequence, the TA request messages sent by different STAs may be distinguished by the sequence design method.

In 2102, after receiving the TA request message sent by the STA, the AP sends a TA polling message to the STA.

In this step, the AP receives the TA request message sent by the STA and then initiates to measure the time alignment information. Thus, the AP sends the TA polling message to the STA to initiate to measure the time alignment information. The principle for the step in which the AP sends the TA polling message to the STA is the same as that in step 1801 of the eleventh embodiment, and specific contents may be referred to the description in step 1801 of the eleventh embodiment, which is not described herein.

In 2103, the STA receives the TA polling message from the AP and returns a TA sequence message to the AP after an FT.

The principle for this step is the same as that in step 1802 of the eleventh embodiment, and specific contents may be referred to the description in step 1802 in the eleventh embodiment, which is not described herein.

In 2104, the AP receives the TA sequence message returned by the STA; and measures the time alignment information based on a time instant when the TA polling message is sent, a time instant when the TA sequence message returned by the STA is received, and an FT.

The principle for this step is the same as that in step 1803 of the eleventh embodiment, and specific contents may be referred to the description in step 1803 of the eleventh embodiment, which is not described herein.

Figure 22:
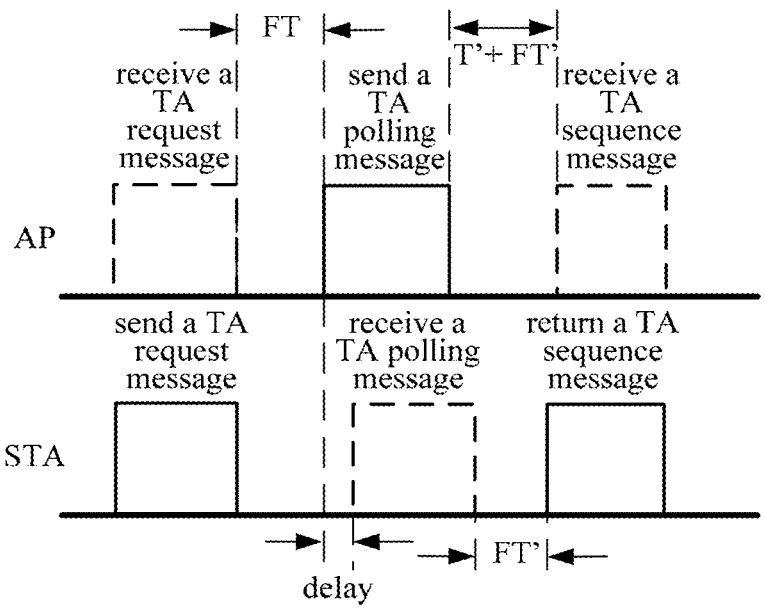
FIG. 22 is a schematic diagram showing a process of measuring time alignment information according to the twelfth embodiment of the present application.

FIG. 22 is a schematic diagram showing a process for measuring time alignment information by an interaction between an AP and an STA. The interaction process is that: the STA sends a TA request message to an AP, to trigger the AP to initiate to measure the time alignment information; after receiving the TA request message, the AP sends a TA polling message to the STA; the TA polling message is transmitted through the wireless local area network for a time period and then is received by the STA; the STA returns a TA sequence message to the AP after an FT; and after receiving the TA sequence message returned by the STA, the AP measures and obtains the time alignment information based on the time instant when the TA sequence message is received, the time instant when the TA polling message is sent, and an FT.

In 2105, the AP sends to the STA a TA adjusting command carrying the time alignment information.

In this step, the TA adjusting command sent from the AP to the STA carries the time alignment information. Thus, the STA adjusts a timing advance of a signal transmission based on the time alignment information carried in the received TA adjusting command. In addition, the TA adjusting command further carries an identifier of the STA. The identifier of the STA carried in the TA adjusting command includes but not limited to a MAC address corresponding to the STA, and specific contents of the identifier of the STA are not limited in the embodiment of the present application.

In addition, the TA adjusting command further includes an instruction for distinguishing new time alignment information and updated time alignment information. Specifically, the new time alignment information indicates time alignment information of a large range in a more bit number, and the updated time alignment information indicates time alignment information relative to a current uplink sending time instant in a less bit number.

In 2106, the STA receives the TA adjusting command sent by the AP, and adjusts a timing advance of a signal transmission based on the tine alignment information carried in the TA adjusting command.

In this step, after receiving the TA adjusting command sent by the AP, the STA adjusts a timing advance of a signal transmission based on the time alignment information carried in the TA adjusting command when the STA sends an uplink signal to the AP next time, i.e., the STA adjusts the TA using the time alignment information carried in the TA adjusting command.

With the method according to the embodiment of the present application, the AP measures and obtains the time alignment information based on the sent message and the received message, and sends the time alignment information to the STA. The STA adjusts the timing advance for sending the signal from the STA to the AP based on the time alignment information. In this way, the STA can adjust the timing advance of the signal transmission in the case of limited time-frequency resources, thereby reducing interference among signals sent from different STAs to the AP.

Thirteenth Embodiment

Figure 23:
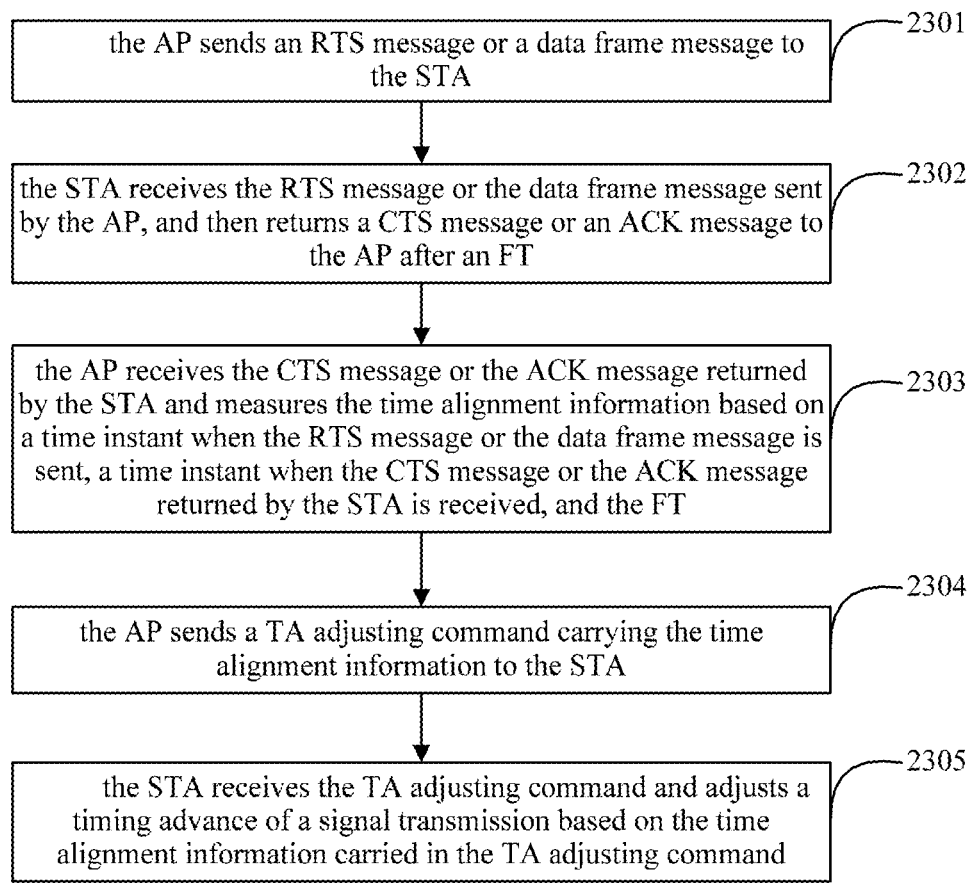
FIG. 23 is a flowchart of a method for adjusting a timing advance according to a thirteenth embodiment of the present application.

In conjunction with the content of the tenth embodiment, a method for adjusting a timing advance is provided according to an embodiment of the present application. The method may be applied to the wireless local area network shown in FIG. 1. In order to facilitate illustration, the method according to the embodiment of the present application is described by assuming that an AP initiates to adjust a timing advance, a downlink message sent from the AP to the STA is an RTS message or a data frame message, and an uplink message returned from the STA to the AP is a CTS message or an ACK message. Referring to FIG. 23, a flow of the method according to embodiment of the present application includes the follows.

In 2301, an AP sends an RTS message or a data frame message to an STA.

In this step, the AP sends the RTS message or the data frame message to the STA, such that time alignment information may be measured based on a time difference between a time instant when the message is sent and a time instant when the message is received in subsequent steps. In addition, the RTS message or the data frame message may be sent in a form of a frame, which is not limited by the embodiment of the present application.

The wireless local area network includes multiple STAs. In order to make the multiple STAs to identify the RTS message or the data frame message is sent by which AP, an identifier of the STA may be carried in the RTS message or the data frame message sent from the AP to the STA.

Specifically, the identifier of the STA includes but not limited to a MAC address corresponding to the STA, and specific contents of the identifier of the STA are not limited in the embodiment of the present application. Alternatively, RTS messages or data frame messages sent from different STAs may be distinguished in designing the RTS message or the data frame message. For example, if the RTS messages or the data frame messages sent from the AP to different STAs may form a sequence, the RTS messages or the data frame messages sent to different STAs may be distinguished by the sequence design method.

In addition, in the embodiment of the present application, one AP communicates with multiple STAs, and thus the AP does not need to be identified. However, in the case of multiple APs in one wireless local area network, when the AP sends the TA polling message to the STA, in order to make the STA to identify that the TA polling message is sent by which AP, an identifier of the AP may be carried in the TA polling message. The identifier is configured to make the STA identify an AP sending the TA polling message. The identifier of the AP includes but not limited to a MAC address corresponding to the AP, and specific contents of the identifier of the AP are not limited in the embodiment of the present application.

In 2302, the STA receives the RTS message or the data frame message sent by the AP, and returns a CTS message or an ACK message to the AP after an FT.

In this step, the FT may be any time duration, and a size of the FT is not limited in the embodiment of the present application. The FT may be set by the AP negotiating with the STA in advance, or may be determined by the STA. If the FT is determined by the STA, the FT is carried in the CTS message or the ACK message returned from the STA to the AP.

In the embodiment of the present application, the CTS message or the ACK message may be sent in a form of a data frame, which is not limited in the embodiment of the present application. In addition, due to multiple STAs in the wireless local area network, in order to make the AP to identify that the CTS message or the ACK message is returned by which STA, an identifier of the STA may be carried in the CTS message or the ACK message returned from the STA to the AP. Specifically, the identifier of the STA includes but not limited to a MAC address corresponding to the STA, and specific contents of the identifier of the STA are not limited in the embodiment of the present application. Alternatively, CTS messages or ACK messages returned from different STAs to the AP may be distinguished in designing the CTS messages or the ACK messages. For example, if the CTS messages or the ACK messages returned from different STAs to the AP may form a sequence, the CTS messages or the ACK messages sent from different STAs to the AP may be distinguished by the sequence design method.

In addition, in the embodiment of the present application, one AP communicates with multiple STAs, and thus the AP does not need to be identified. However, in the case of multiple APs in one wireless local area network, when receiving the RTS message or the data frame message from the AP, the STA needs to identify the AP which sends the RTS message or the data frame message. The way for the STA identifying the AP, which sends the RTS message or the data frame message, is not limited in the embodiment of the present application. In a specific implementation, if an identifier of the AP is carried in the RTS message or the data frame message sent by the AP, the STA may identify the AP based on the identifier of the AP carried in the RTS message or the data frame message.

In 2303, the AP receives the CTS message or the ACK message returned by the STA and measures time alignment information based on a time instant when the RTS message or the data frame message is sent, a time instant when the CTS message or the ACK message returned by the STA is received, and an FT.

In this step, after receiving the CTS message or the ACK message returned by the STA, the AP distinguishes different STAs and then measures the time alignment information based on the time instant when the RTS message or the data frame message is sent, the time instant when the CTS message or the ACK message returned by the STA is received, and the FT. In a specific implementation, the way for measuring the time alignment information by the AP is not limited in the embodiment, which includes but not limited to measuring the timing alignment information according to the following formula:

$$T'=t1'-t2'-FT'.$$

where T' indicates the measured time alignment information, t1' indicates the time instant when the CTS message or the ACK message returned by the STA is received by the AP, t2' indicates the time instant when the RTS message or the data frame message is sent by the AP, and FT' indicates the known fixed time period.

Figure 24:
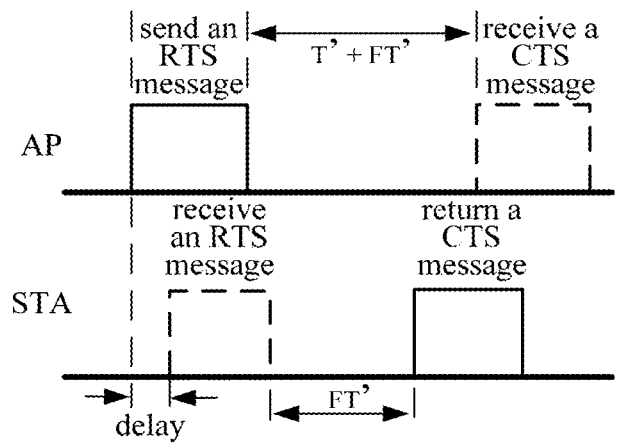
FIG. 24 is a schematic diagram showing a process of measuring time alignment information according to the thirteenth embodiment of the present application.

FIG. 24 is a schematic diagram showing a process for measuring time alignment information by an interaction between an AP and an STA. The interaction process is that: the AP sends an RTS message to the STA; the RTS message is transmitted through the wireless local area network for a time period and then is received by the STA; the STA returns a CTS message to the AP after an FT; and after receiving the CTS message returned by the STA, the AP measures and obtains the time alignment information based on a time instant when the CTS message is received, a time instant when the RTS message is sent, and the FT.

Figure 25:
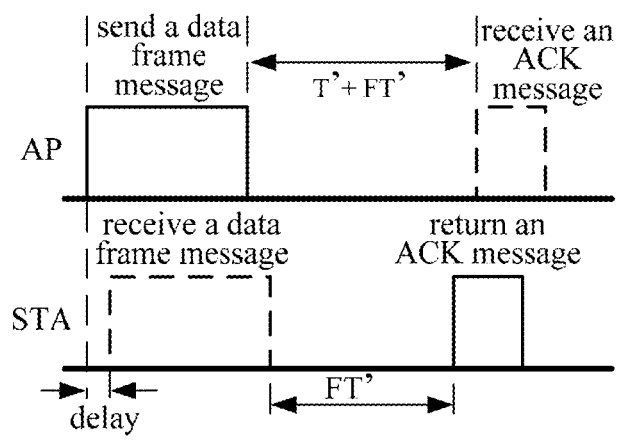
FIG. 25 is a schematic diagram showing a process of measuring time alignment information according to the thirteenth embodiment of the present application.

FIG. 25 is a schematic diagram showing a process for measuring time alignment information by an interaction between an AP and an STA. The interaction process is that: the AP sends a data frame message to the STA; the data frame message is transmitted through the wireless local area network for a time period and then is received by the STA; the STA returns an ACK message to the AP after an FT; and after receiving the ACK message returned by the STA, the AP measures and obtains the time alignment information based on a time instant when the ACK message is received, a time instant when the data frame message is sent, and the FT.

In 2304, the AP sends a TA adjusting command carrying the time alignment information to the STA.

In this step, the TA adjusting command sent from the AP to the STA carries the time alignment information. Then, the STA adjusts a timing advance of a signal transmission based on the time alignment information carried in the received TA adjusting command. In addition, the TA adjusting command further carries an identifier of the STA. The identifier of the STA carried in the TA adjusting command includes but not limited to a MAC address corresponding to the STA, and specific contents of the identifier of the STA are not limited in the embodiment of the present application.

In addition, the TA adjusting command further includes new time alignment information and updated time alignment information. Specifically, the new time alignment information indicates time alignment information of a large range in a more bit number, and the updated time alignment information indicates time alignment information relative to a current uplink sending time instant in a less bit number.

In 2305, the STA receives the TA adjusting command and adjusts a timing advance of a signal transmission based on the time alignment information carried in the TA adjusting command.

In this step, after receiving the TA adjusting command sent by the AP, the STA adjusts a timing advance of a signal transmission based on the time alignment information carried in the TA adjusting command when the STA sends an uplink signal to the AP next time, i.e., the STA adjusts the TA using the time alignment information carried in the TA adjusting command.

It should be noted that, the method according to the embodiment of the present application is described by taking that a downlink message during the interaction between the AP and the STA is the RTS message or the data frame message and an uplink message during the interaction is the CTS message or the ACK message as example. In an actual application process, the time alignment information may be measured based on an immediate block response message such as a BAR (Block Acknowledge Request)/BA (Block Acknowledge), and a delay response message such as BAR/ACK, BA/ACK, association response/ACK, reassociation response/ACK, probe response/ACK and data frame/ACK. The specific process for measuring the time alignment information is the same as that of the method according to the embodiment of the present application, which is not described herein.

With the method according to the embodiment of the present application, the AP measures and obtains the time alignment information based on the sent message and the received message, and sends the time alignment information to the STA. The STA adjusts the timing advance for sending the signal from the STA to the AP based on the time alignment information. In this way, the STA can adjust the timing advance of the signal transmission in the case of limited time-frequency resources, thereby reducing interference among signals sent from different STAs to the AP.

Fourteenth Embodiment

Figure 26:
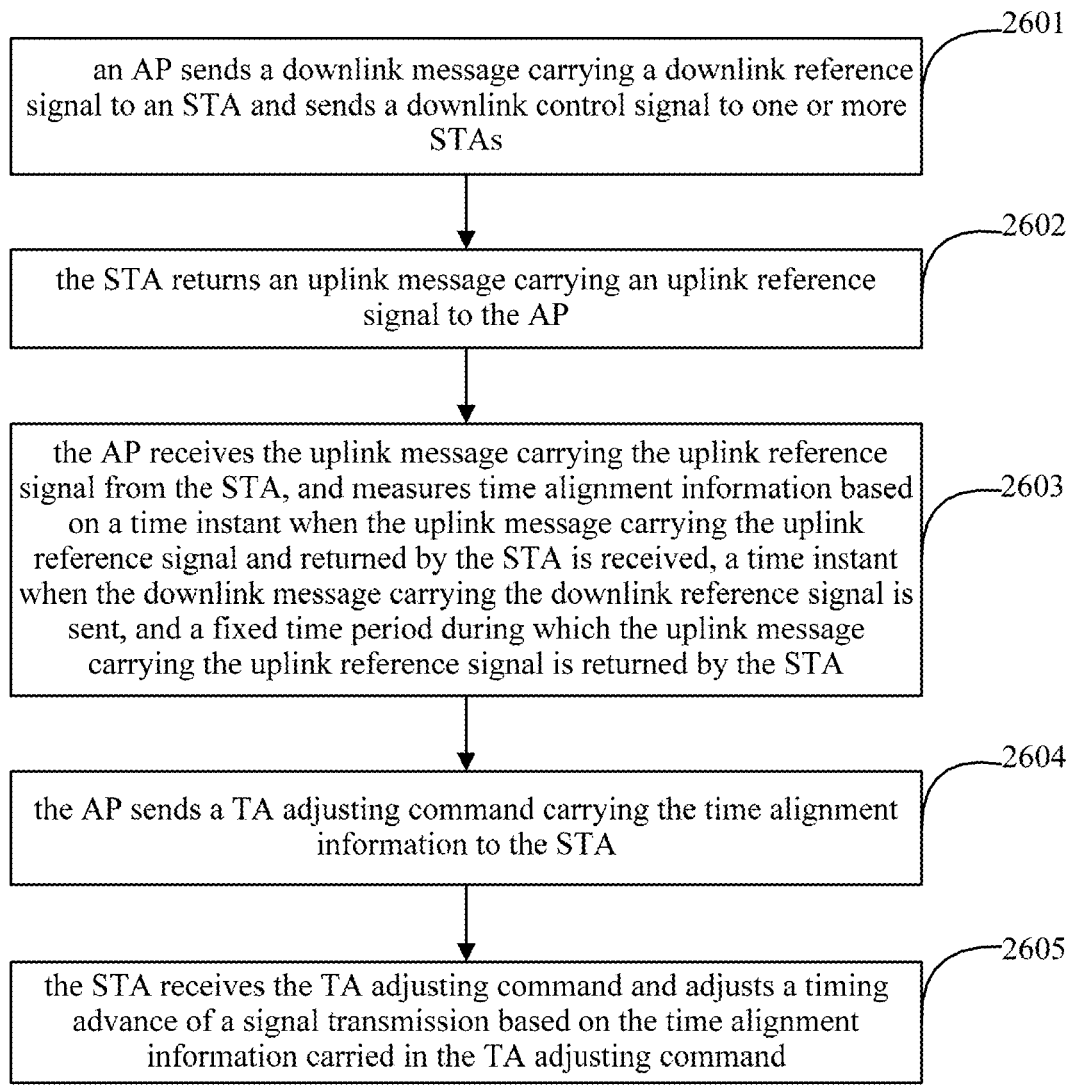
FIG. 26 is a flowchart of a method for adjusting a timing advance according to a fourteenth embodiment of the present application.

In conjunction with the content of the tenth embodiment, a method for adjusting a timing advance is provided according to an embodiment of the present application. The method may be applied to the wireless local area network shown in FIG. 1. In order to facilitate illustration, the method according to the embodiment of the present application is described by assuming that an AP initiates to adjust a timing advance, a downlink message sent from the AP to the STA is a downlink message carrying a downlink reference signal, and an uplink message returned from the STA to the AP is an uplink message carrying an uplink reference signal. Referring to FIG. 26, a flow of the method includes the follows.

In 2601, an AP sends a downlink message carrying a downlink reference signal to an STA, and sends a downlink control signal to one or more STAs.

In this step, the downlink message, which carries the downlink reference signal and sends from the AP to the STA, may be any downlink message, and a specific form of the downlink message is not limited in the embodiment of the present application, as long as the downlink message may carry the downlink reference signal. In addition, in this step, the downlink message carries the downlink reference signal, such that the STA receiving the downlink message can obtain a downlink time synchronization based on the downlink reference signal. The downlink message carrying the downlink reference signal may be sent in a form of a data frame, which is not limited in the embodiment of the present application.

The AP sends the downlink control signal to one or more STAs, such that one or more STAs is scheduled by the downlink control signal to send a time-frequency resource for an uplink reference signal to the AP. In addition, the AP may send the downlink control signal in many ways, and a form of the downlink control signal is not limited in the embodiment.

In 2602, the STA returns an uplink message carrying an uplink reference signal to the AP.

In this step, the STA returns the uplink message carrying the uplink reference signal to the AP after receiving the downlink control signal from the AP. The AP sends the downlink control signal to schedule the STA to send a time-frequency resource for the uplink reference signal. Thus, the STA returns the uplink message carrying the uplink reference signal to the AP using the time-frequency resource scheduled by the AP. Specifically, the time-frequency resources for sending the uplink reference signal by the STA based on the scheduling of the AP are mutually orthogonal by means of TDM (Time Division Multiplexing), FDM (Frequency Division Multiplexing), CDM (Code Division Multiplexing) or SDM (Space Division Multiplexing). In this way, different uplink reference signals may be distinguished based on the time-frequency resources and the STA for sending the uplink message may be identified based on the uplink reference signal carried in the uplink message.

In addition, the uplink message carrying the uplink reference signal may be sent in a form of a data frame or in a form of a TA sequence message, which is not limited in the embodiment of the present application.

In 2603, the AP receives the uplink message carrying the uplink reference signal from the STA, and measures the time alignment information based on a time instant when the uplink message carrying the uplink reference signal and returned by the STA is received, a time instant when the downlink message carrying the downlink reference signal is sent, and a fixed time period during which the uplink message carrying the uplink reference signal is returned by the STA.

In this step, after receiving the uplink message carrying the uplink reference signal from the STA, the AP distinguishes different STAs based on different time-frequency resources corresponding to the respective uplink reference signals carried in the uplink messages, and then obtains time alignment information corresponding to the STA based on a time instant when the downlink message carrying the downlink reference signal is sent to the STA, a time instant when the uplink message carrying the uplink reference signal and sent by the STA is received and a fixed time period during which the uplink message carrying the uplink reference signal is sent by the STA. Before sending the uplink message carrying the uplink reference signal to the AP, each STA has performed time synchronization, hence a duration of the fixed time period during which the STA sends the uplink message carrying the uplink reference signal may be 0.

In 2604, the AP sends a TA adjusting command carrying the time alignment information to the STA.

In this step, the TA adjusting command sent from the AP to the STA carries the time alignment information, such that the STA adjusts a timing advance of a signal transmission based on the time alignment information carried in the received TA adjusting command. In addition, the TA adjusting command may carry an identifier of the STA. The identifier of the STA carried in the TA adjusting command includes but not limited to a MAC address corresponding to the STA, and specific contents of the identifier of the STA is not limited in the embodiment of the present application.

In addition, the TA adjusting command further includes an instruction for distinguishing new time alignment information and updated time alignment information. In a specific presentation of the TA adjusting command, for example in a data frame, the new time alignment information indicates time alignment information of a large range in a more bit number, and the updated time alignment information indicates time alignment information relative to a current uplink sending time instant in a less bit number.

In 2605, the STA receives the TA adjusting command and adjusts a timing advance of a signal transmission based on the time alignment information carried in the TA adjusting command.

In this step, after receiving the TA adjusting command from the AP, the STA adjusts the timing advance of a signal transmission based on the time alignment information carried in the TA adjusting command when the STA sends an uplink signal to the AP next time, i.e., the STA adjusts the TA using the time alignment information carried in the TA adjusting command.

With the method according to the embodiment of the present application, the AP measures and obtains the time alignment information based on the sent message and the received message, and sends the time alignment information to the STA. The STA adjusts the timing advance for sending the signal from the STA to the AP based on the time alignment information. In this way, the STA can adjust the timing advance of the signal transmission in the case of limited time-frequency resources, and thereby reducing interference among signals sent from different STAs to the AP.

Fifteenth Embodiment

Figure 27:
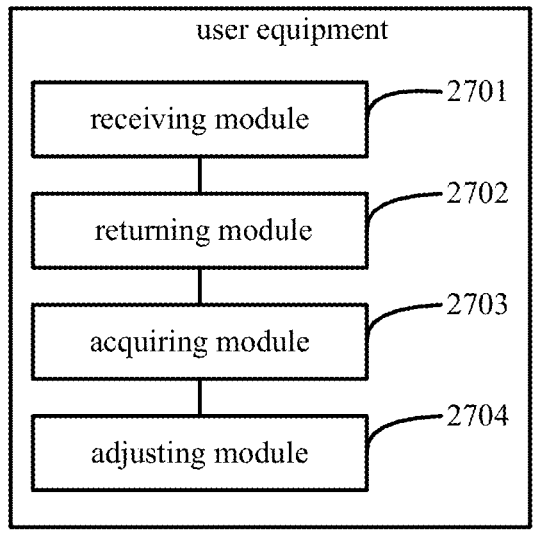
FIG. 27 is a schematic structural diagram of user equipment according to a fifteenth embodiment of the present application.

User equipment is provided according to an embodiment of the present application. The equipment may be applied to a wireless local area network and used to achieve functions of the user equipment mentioned in the method for adjusting the timing advance according to any one of the tenth embodiment to the fourteenth embodiment. Referring to FIG. 27, the user equipment includes the follows.

A receiving module 2701 is configured to receive a downlink message sent by an access point AP.

A returning module 2702 is configured to return an uplink message to the AP, where the AP obtains time alignment information based on a time instant when the downlink message is sent, a time instant when the uplink message is received, and a fixed time period during which the uplink message is returned by the AP.

An acquiring module 2703 is configured to acquire the time alignment information obtained by the access point AP.

An adjusting module 2704 is configured to adjust a timing advance of a signal transmission based on the time alignment information.

In a preferred embodiment, the acquiring module 2703 is configured to receive a timing advance TA adjusting command sent by the AP and acquire the time alignment information from the TA adjusting command.

In a preferred embodiment, the downlink message sent by the AP and received by receiving module 2701 is a TA polling message, and the uplink message returned from the returning module 2702 to the AP is a TA sequence message.

Alternatively, the downlink message sent by the AP and received by the receiving module 2701 is a request-to-send RTS message, and the uplink message returned from the returning module 2702 to the AP is a clear-to-send CTS message.

Alternatively, the downlink message sent by the AP and received by the receiving module 2701 is a data frame message, and the uplink message returned from the returning module 2702 to the AP is an acknowledge ACK message.

Alternatively, the downlink message sent by the AP and received by the receiving module 2701 is a downlink message carrying a downlink reference signal, and the uplink message returned from the returning module 2702 to the AP is an uplink message carrying an uplink reference signal.

In a preferred embodiment, the user equipment further includes:

a sending module configured to send a TA request message to the AP, where the AP sends a TA polling message in response to the TA request message.

According to the embodiment of the present application, the user equipment measures and obtains the time alignment information based on the downlink message sent by the AP and the uplink message received by the AP, and adjusts the timing advance for sending the signal to the AP based on the time alignment information. In this way, the timing advance of the signal transmission may be adjusted in the case of limited time-frequency resources, and thereby reducing interference among signals sent from different STAs to the AP.

Sixteenth Embodiment

Figure 28:
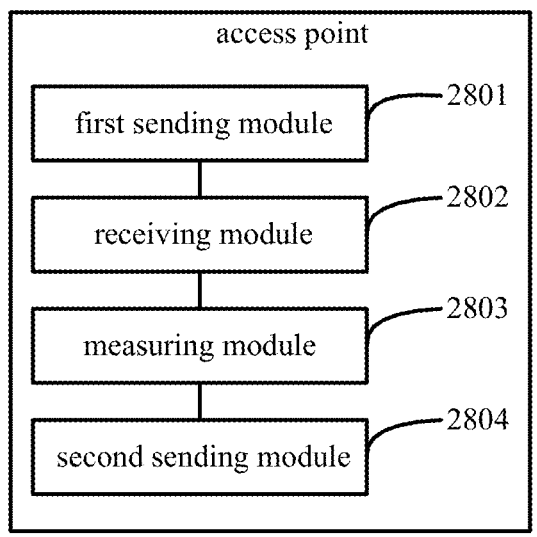
FIG. 28 is a schematic structural diagram of an access point according to a sixteenth embodiment of the present application.

An access point is provided according to an embodiment of the present application. The access point may be applied to a wireless local area network and used to achieve functions of the access point mentioned in the method for adjusting the timing advance according to any one of the tenth embodiment to the fourteenth embodiment. Referring to FIG. 28, the access point includes the follows.

A first sending module 2801 is configured to send a downlink message to a user equipment STA.

A receiving module 2802 is configured to receive an uplink message returned by the STA.

A measuring module 2803 is configured to obtain time alignment information based on a time instant when the downlink message is sent, a time instant when the uplink message is returned by the STA and a fixed time period during which the uplink message is returned by the STA.

A second sending module 2804 is configured to send the obtained time alignment information to the user equipment STA, where the STA adjusts the timing advance of a signal transmission based on the time alignment information.

In a preferred embodiment, the second sending module 2804 is configured to send to the STA a TA adjusting command carrying the time alignment information, where the STA adjusts the timing advance of the signal transmission based on the time alignment information carried in the TA adjusting command.

In a preferred embodiment, the measuring module 2803 is configured to obtain the time alignment information according to a formula $T'=t1'-t2'-FT'$, where, $T'$ indicates time alignment information obtained by a measurement, $t1'$ indicates a time instant when the uplink message returned by the STA is received, $t2'$ indicates a time instant when the downlink message is sent, and $FT'$ indicates a fixed time period during which the uplink signal is returned by the STA.

In a preferred embodiment, the downlink message sent from the first sending module 2801 to the STA is a TA polling message, and the uplink message returned by the STA and received by the receiving module 2802 is a TA sequence message.

Alternatively, the downlink message sent from the first sending module 2801 to the STA is a request-to-send RTS message, and the uplink message returned by the STA and received by the receiving module 2802 is a clear-to-send CTS message.

Alternatively, the downlink message sent from the first sending module 2801 to the STA is a data frame message, and the uplink message returned by the STA and received by the receiving module 2802 is an acknowledge ACK message.

Alternatively, the downlink message sent from the first sending module 2801 to the STA is a downlink message carrying a downlink reference signal, and the uplink message returned by the STA and received by the receiving module 2802 is an uplink message carrying an uplink reference signal.

In a preferred embodiment, the receiving module 2802 is further configured to receive a TA request message from the STA, where the first sending module sends the TA polling message to the STA in response to the TA request message.

According to the embodiment of the present application, the access point measures and obtains the time alignment information based on the sent message and the received message, and sends the time alignment information to the STA. The STA adjusts the timing advance for sending the signal from the STA to the AP based on the time alignment information. In this way, the STA can adjust the timing advance of the signal transmission in the case of limited time-frequency resources, and thereby reducing interference among signals sent from different STAs to the AP.

Seventeenth Embodiment

Figure 29:
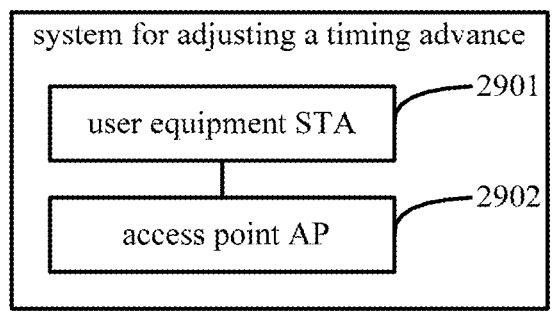
FIG. 29 is a schematic structural diagram of a system for adjusting a timing advance according to a seventeenth embodiment of the present application.

A system for adjusting a timing advance is provided according to an embodiment of the present application. The system may be applied to a wireless local area network. Referring to FIG. 29, the system includes a user equipment STA 2901 and an access point AP 2902.

The STA 2901 is the STA according to the fifteenth embodiment, and specific contents may be referred to the description in the fifteenth embodiment, which are not described herein.

The AP 2902 is the AP according to the sixteenth embodiment, and specific contents may be referred to the description in the sixteenth embodiment, which are not described herein.

With the system according to the embodiment of the present application, the AP measures and obtains the time alignment information based on the sent message and the received message, and sends the time alignment information to the STA. The STA adjusts the timing advance for sending the signal from the STA to the AP based on the time alignment information. In this way, the STA can adjust the timing advance of the signal transmission in the case of limited time-frequency resources, and thereby reducing interference among signals sent from different STAs to the AP.

Eighteenth Embodiment

Figure 30:
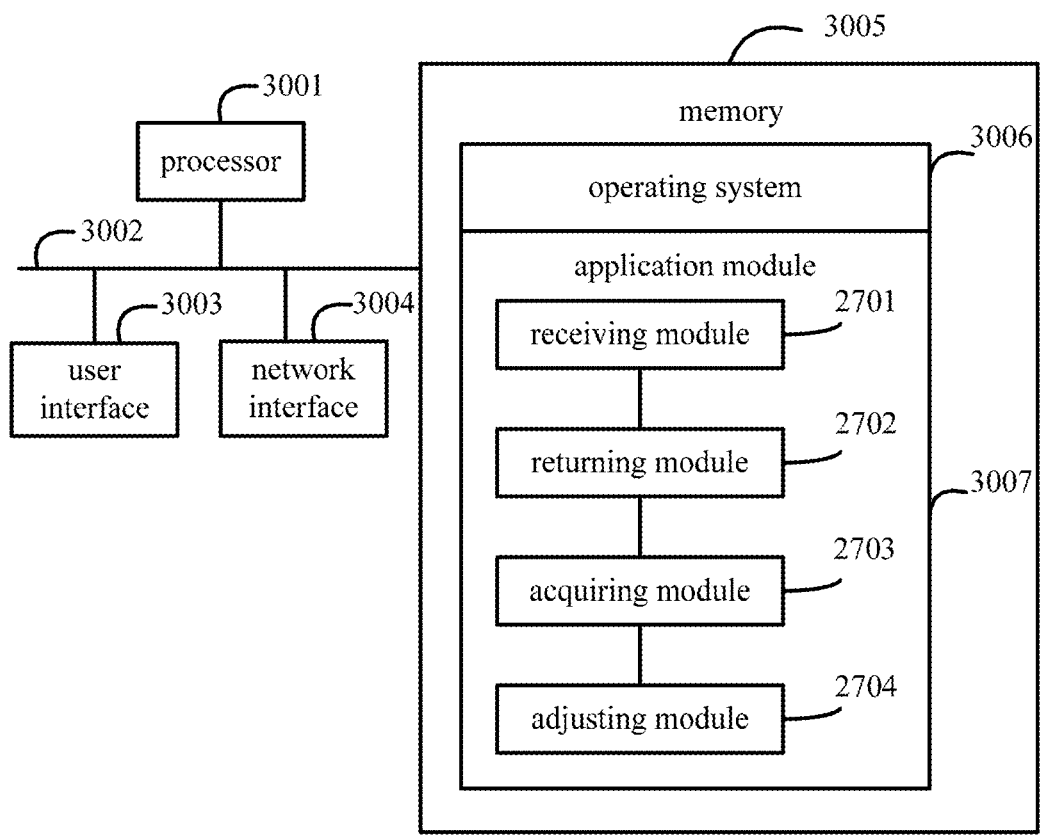
FIG. 30 is a schematic structural diagram of user equipment according to an eighteenth embodiment of the present application.

FIG. 30 is a schematic structural diagram of user equipment according to an embodiment. The user equipment includes at least one processor (3001) for example a CPU, at least one network interface 3004 or other user interfaces 3003, a memory 3005 and at least one communication bus 3002. The communication bus 3002 is used to perform connection communication between the devices. The user interface 3003 may be a display, a keyboard or a pointing device. The memory 3005 may include a high speed Ram memory or may include a non-volatile memory (non-volatile memory) for example at least one magnetic disk memory. Optionally, the memory 3005 may contain at least one storage device far away from the CPU 802. In some embodiments, the memory 305 stores modules, data structures, subsets thereof or supersets thereof.

The operating system 3006 contains various types of programs for performing respective basic services and processing tasks based on hardware.

The application module 3007 includes a receiving module 2701, a returning module 2702, an acquiring module 2703 and an adjusting module 2704. Functions of the above modules may be referred to the description of the operation principle diagram in FIG. 27, which are not described herein.

According to the embodiment of the present application, the AP measures and obtains the time alignment information based on the downlink message sent by the AP and the uplink message received by the AP. The user equipment receives the time alignment information and adjusts the timing advance for sending the signal to the AP based on the time alignment information. In this way, the timing advance of the signal transmission can be adjusted in the case of limited time-frequency resources, and thereby reducing interference among signals sent from different STAs to the AP.

Nineteenth Embodiment

Figure 31:
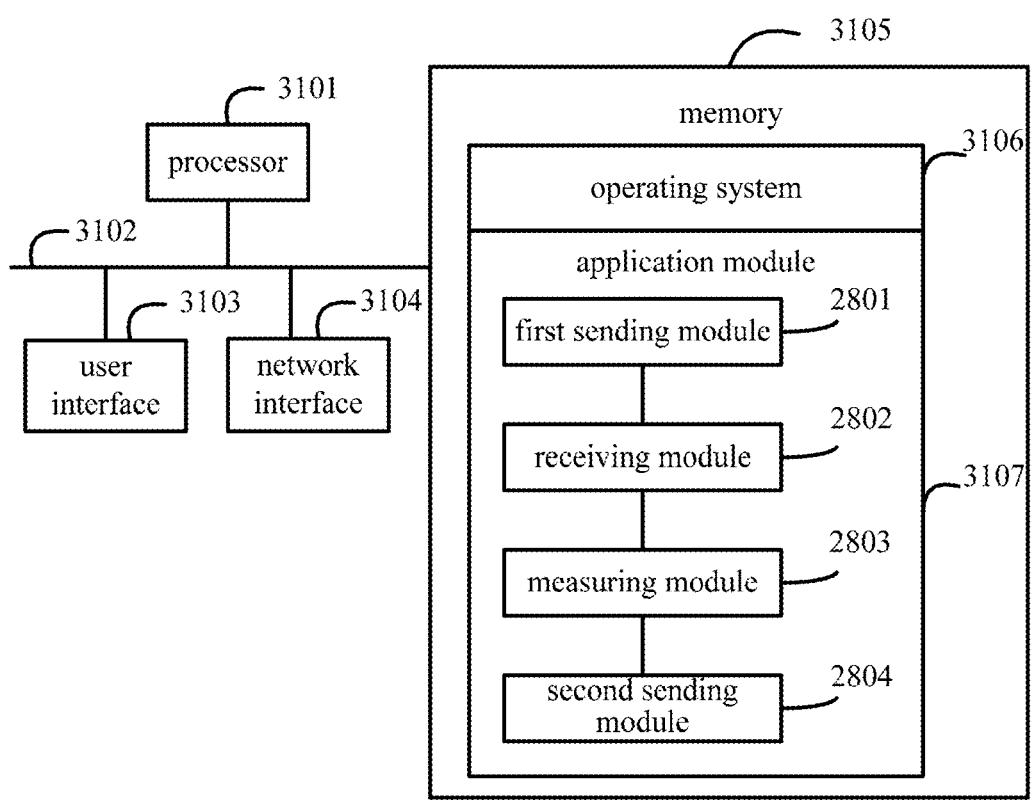
FIG. 31 is a schematic structural diagram of an access point according to a nineteenth embodiment of the present application.

FIG. 31 is schematic structural diagram of an access point according to an embodiment. The access point includes at least one processor (1301) for example a CPU, at least one network interface 3104 or other user interfaces 3103, a memory 3105 and at least one communication bus 3102. The communication bus 3102 is used to perform connection communication between the devices. The user interface 3103 may be a display, a keyboard or a pointing device. The memory 3105 may include a high speed Ram memory or may include a non-volatile memory (non-volatile memory) for example at least one magnetic disc memory. Optionally, the memory 3105 may include at least one storage device far away from the CPU 802. In some embodiments, the memory 3105 stores modules, data structures, subsets thereof or supersets thereof.

The operating system 3106 contains various types of programs for performing respective basic services and processing tasks based on hardware.

The application module 3107 includes a first sending module 2801, a receiving module 2802, a measuring module 2803 and a second sending module 2804. Functions of the above modules may be referred to the description of the operation principle diagram in FIG. 28, which are not described herein.

According to the embodiment of the present application, the access point measures and obtains the time alignment information based on the sent message and the received message, and sends the time alignment information to the STA. The STA adjusts the timing advance for sending the signal from the STA to the AP based on the time alignment information. In this way, the STA can adjust the timing advance of the signal transmission in the case of limited time-frequency resources, and thereby reducing interference among signals sent from different STAs to the AP.

It should be noted that, in a process of adjusting the timing advance, the access point and the user equipment according to the above embodiments is described as an example by the division of the respective functional modules. In an actual application, the functions may be distributed to different functional modules as needed, i.e., an internal structure of the device is divided into different functional modules to complete all or a part of the functions described above. In addition, the embodiments of the access point, the user equipment and the system for adjusting the timing advance share the same inventive concept as the embodiments of the method for adjusting a timing advance, and specific contents may be referred to the method embodiments, which are not described herein.

The number of the above embodiments of the present application is only intended to describe conveniently and does not represent a superior embodiment or an inferior embodiment.

Those skilled in the art should understand that all or a part of steps of the above embodiments may be performed by hardware or by related hardware instructed by programs. The programs may be stored in a computer readable storage medium, for example a read only memory, a magnetic disk or an optical disk.

The preferred embodiments of the present application are described above and are not intended to limit the present application. Any changes, equivalent substitutions or improvements made to the present application without departing from the spirit and principles of the present application fall within the scope of protection of the present application.

What is claimed is:

1. A method for adjusting a timing advance, wherein the method is applied in a wireless local area network and the method comprises:
    sending an uplink message to an access point (AP) and receiving a downlink message returned by the AP;
    obtaining time alignment information based on a time instant when the uplink message is sent, a time instant when the downlink message returned by the AP is received and a fixed time period between a time instant when the uplink message is received by the AP and a time instant when the downlink message is returned by the AP; and
    adjusting a timing advance of a signal transmission based on the time alignment information.

2. The method according to claim 1, wherein obtaining the time alignment information comprises:
    determining the time alignment information according to a formula $T=t1-t2-FT$,
    where T indicates the determined time alignment information, t1 indicates the time instant when the downlink message returned by the AP is received, t2 indicates the time instant when the uplink message is sent to the AP, and FT indicates the fixed time period.

3. The method according to claim 1, wherein
    the uplink message sent to the AP is a timing advance (TA) request message, and the downlink message returned by the AP is a TA response message; or
    the uplink message sent to the AP is a request-to-send (RTS) message, and the downlink message returned by the AP is a clear-to-send (CTS) message; or
    the uplink message sent to the AP is a data frame message, and the downlink message returned by the AP is an acknowledge (ACK) message.

4. The method according to claim 3, wherein before sending the TA request message to the AP, the method further comprises:
    receiving a TA polling message from the AP, wherein the TA request message is sent to the AP based on the TA polling message.

5. A method for adjusting a timing advance, wherein the method is applied in a wireless local area network and the method comprises:
    receiving an uplink message from a user equipment (STA); and
    returning a downlink message to the STA, wherein the STA obtains time alignment information instant when the downlink message is returned to the STA, and a fixed time period between a time instant when the uplink message is received by the AP and a time instant when the downlink message is returned by the AP, and adjusts a timing advance of a signal transmission based on the time alignment information.

6. The method according to claim 5, wherein
    the uplink message received from the user equipment STA is a timing advance (TA) request message, and the downlink message returned to the STA is a TA response message; or
    the uplink message sent by the STA is a request-to-send (RTS) message, and the downlink message returned to the STA is a clear-to-send (CTS) message; or
    the uplink message sent by the STA is a data frame message, and the downlink message returned to the STA is an acknowledge (ACK) message.

7. The method according to claim 6, wherein before receiving the TA request message from the STA, the method further comprises:
    sending a TA polling message to the STA, wherein the STA sends the TA request message based on the TA polling message.

8. A non-transitory storage medium on a user equipment in a wireless local area network, wherein the non-transitory storage medium has a plurality of instructions stored thereon that, when executed by a processor, cause the processor to:
    send an uplink message to an access point (AP);
    receive a downlink message returned by the AP;
    obtain time alignment information based on a time instant when the uplink message is sent, a time instant when the downlink message is received and a fixed time period between a time instant when the uplink message is received by the AP and a time instant when the downlink message is returned by the AP; and
    adjust a timing advance of a signal transmission based on the time alignment information.

9. The non-transitory storage medium according to claim 8, further comprising instructions causing the processor to determine the time alignment information according to a formula $T=t1-t2-FT$,
    wherein T indicates the determined time alignment information, t1 indicates the time instant when the downlink message returned by the AP is received, t2 indicates the time instant when the uplink message is sent to the AP, and FT indicates the fixed time period.

10. The non-transitory storage medium according to claim 8, wherein
    the uplink message sent from the sending module to the AP is a timing advance (TA) request message, and the downlink message returned by the AP and received by the receiving module is a TA response message; or the uplink message sent from the sending module to the AP is a request-to-send (RTS) message, and the downlink message returned by the AP and received by the receiving module is a clear-to-send (CTS) message; or the uplink message sent from the sending module to the AP is a data frame message, and the downlink message returned by the AP and received by the receiving module is an acknowledge (ACK) message.

11. The non-transitory storage medium according to claim 10, further comprising instructions causing the processor to receive a TA polling message from the AP; and send the TA request message to the AP based on the TA polling message.

12. A non-transitory storage medium on an access point in a wireless local area network, wherein the non-transitory storage medium has a plurality of instructions stored thereon that, when executed by a processor, cause the processor to:

receive an uplink message from a user equipment (STA); and return a downlink message to the STA, wherein the STA obtains time alignment information based on a time instant when the uplink message is sent, a time instant when the downlink message is returned to the STA, and a fixed time period between a time instant when the uplink message is received by the AP and a time instant when the downlink message is returned by the AP; and adjusts a timing advance of a signal transmission based on the time alignment information.

13. The non-transitory storage medium according to claim 12, wherein the uplink message sent by the user equipment STA and received by the receiving module is a timing advance (TA) request message, and the downlink message returned from the returning module to the STA is a TA response message; or the uplink message sent by the STA and received by the receiving module is a request-to-send (RTS) message, and the downlink message returned from the returning module to the STA is a clear-to-send (CTS) message; or the uplink message sent by the STA and received by the receiving module is a data frame message, and the downlink message returned from the returning module to the STA is an acknowledge (ACK) message.

14. The non-transitory storage medium according to claim 13, further comprising instructions causing the processor to send a TA polling message to the STA; and wherein the STA is configured to send the TA request message based on the TA polling message.

* * * * *

UNITED STATES PATENT AND TRADEMARK OFFICE
CERTIFICATE OF CORRECTION

PATENT NO. : 10,034,254 B2
APPLICATION NO. : 15/065415
DATED : July 24, 2018
INVENTOR(S) : Ma et al.

Page 1 of 1

It is certified that error appears in the above-identified patent and that said Letters Patent is hereby corrected as shown below:

In the Claims

Column 36, Line 17 Claim 5 "alignment information instant when" should read -- alignment information based on a time instant when the uplink message is sent, a time instant when --.

Signed and Sealed this
Second Day of October, 2018

Andrei Iancu
*Director of the United States Patent and Trademark Office*